(12) United States Patent
Kasuya et al.

(10) Patent No.: US 11,503,183 B2
(45) Date of Patent: Nov. 15, 2022

(54) IMAGE FORMATION APPARATUS AND STORING MEDIUM

(71) Applicant: CANON KABUSHIKI KAISHA, Tokyo (JP)

(72) Inventors: Kenji Kasuya, Tokyo (JP); Yoshitake Mizuno, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/674,024

(22) Filed: Feb. 17, 2022

(65) Prior Publication Data
US 2022/0174180 A1 Jun. 2, 2022

Related U.S. Application Data

(63) Continuation of application No. 17/018,238, filed on Sep. 11, 2020, now Pat. No. 11,297,202.

(30) Foreign Application Priority Data

Sep. 17, 2019 (JP) .............................. JP2019-168341
Nov. 28, 2019 (JP) .............................. JP2019-215444

(51) Int. Cl.
*G03G 15/00* (2006.01)
*H04N 1/387* (2006.01)

(52) U.S. Cl.
CPC ....... *H04N 1/3873* (2013.01); *G03G 15/5041* (2013.01); *G03G 15/5062* (2013.01)

(58) Field of Classification Search
None
See application file for complete search history.

(56) References Cited

U.S. PATENT DOCUMENTS

| | | |
|---|---|---|
| 4,984,020 A | 1/1991 | Adachi |
| 10,284,747 B2 | 5/2019 | Sakata |
| 2005/0213996 A1 | 9/2005 | Amano |
| 2006/0045547 A1 | 3/2006 | Aiyama |
| 2015/0378297 A1 | 12/2015 | Nakura |
| 2016/0154357 A1 | 6/2016 | Naruse |
| 2017/0131671 A1 | 5/2017 | Nishimura |
| 2019/0113873 A1 | 4/2019 | Wakabayashi |
| 2019/0212684 A1 | 7/2019 | Watanabe |
| 2019/0302670 A1 | 10/2019 | Kitamura |

FOREIGN PATENT DOCUMENTS

JP 2018124455 A 8/2018

OTHER PUBLICATIONS

Office Action issued in U.S. Appl. No. 17/018,238 dated Jun. 16, 2021.
Notice of Allowance issued in U.S. Appl. No. 17/018,238 dated Dec. 6, 2021.

*Primary Examiner* — Sevan A Aydin
(74) *Attorney, Agent, or Firm* — Rossi, Kimms & McDowell LLP

(57) ABSTRACT

Provided is a printing apparatus including a cassette configured to be capable of managing a stored paper-sheet by using paper-sheet size information and paper-sheet attribute data, in which an adjustment value of a print position is registered to copied paper-sheet attribute data if an event in which the adjustment value is registered to paper-sheet attribute data in which the paper-sheet size information is not set occurs.

11 Claims, 31 Drawing Sheets

500 PAPER-SHEET ATTRIBUTE EDITING

| | |
|---|---|
| PAPER-SHEET NAME | ABC-MANUFACTURED PAPER-SHEET RECYCLE 1 — 501 |
| SUB SCANNING DIRECTION PAPER-SHEET LENGTH (mm) | — 502 |
| MAIN SCANNING DIRECTION PAPER-SHEET LENGTH (mm) | — 503 |
| BASIS WEIGHT (g/m²) | 75 — 504 |
| SURFACE PROPERTY | PLAIN PAPER ▼ — 505 |
| COLOR | WHITE ▼ — 506 |
| SECONDARY TRANSFERRING VOLTAGE ADJUSTMENT | 5 ▼ — 508 |

510 — PAPER-SHEET LENGTH IS REQUIRED

PRINT POSITION DEVIATION AMOUNT

| | (FRONT) | (BACK) |
|---|---|---|
| RIGHT-ANGLE CORRECTION AMOUNT | 0.21 mm | 0.20 mm |
| TRAPEZOIDAL CORRECTION AMOUNT | 0.51 mm | 0.45 mm |
| LEAD POSITION | 0.30 mm | 0.20 mm |
| SIDE POSITION | -0.30 mm | 0.40 mm |
| MAIN SCANNING MAGNIFICATION | +0.002 % | 0.03 % |
| SUB SCANNING MAGNIFICATION | +0.002 % | -0.001 % |

509

PREPRINTED PAPER ☐ — 507

520 END EDITING    521 CANCEL

| FIG.6A |
|--------|
| FIG.6B |
| FIG.6C |

FIG.6A

PAPER-SHEET LIBRARY

| PAPER-SHEET NAME 611 | SUB SCANNING DIRECTION PAPER-SHEET LENGTH (mm) 612 | MAIN SCANNING DIRECTION PAPER-SHEET LENGTH (mm) 613 | BASIS WEIGHT (g/m²) 614 | SURFACE PROPERTY 615 | COLOR 616 | PREPRINTED PAPER 617 | PRINT POSITION DEVIATION AMOUNT | FRONT SURFACE 618 | BACK SURFACE 619 | SECONDARY TRANSFERRING VOLTAGE ADJUSTMENT 620 |
|---|---|---|---|---|---|---|---|---|---|---|
| ABC-MANUFACTURED PAPER-SHEET RECYCLE 1 (601) | — | — | 75 | PLAIN PAPER | WHITE | NO | RIGHT-ANGLE CORRECTION AMOUNT | 0.00 mm | 0.00 mm | +5 |
| | | | | | | | TRAPEZOIDAL CORRECTION AMOUNT | 0.00 mm | 0.00 mm | |
| | | | | | | | LEAD POSITION | 0.00 mm | 0.00 mm | |
| | | | | | | | SIDE POSITION | 0.00 mm | 0.00 mm | |
| | | | | | | | MAIN SCANNING MAGNIFICATION | 0.00 % | 0.00 % | |
| | | | | | | | SUB SCANNING MAGNIFICATION | 0.00 % | 0.00 % | |
| ABC-MANUFACTURED PAPER-SHEET RECYCLE 2 (602) | 297 | 420 | 75 | PLAIN PAPER | WHITE | NO | RIGHT-ANGLE CORRECTION AMOUNT | 0.00 mm | 0.00 mm | −2 |
| | | | | | | | TRAPEZOIDAL CORRECTION AMOUNT | 0.00 mm | 0.00 mm | |
| | | | | | | | LEAD POSITION | 0.00 mm | 0.00 mm | |
| | | | | | | | SIDE POSITION | 0.00 mm | 0.00 mm | |
| | | | | | | | MAIN SCANNING MAGNIFICATION | 0.00 % | 0.00 % | |
| | | | | | | | SUB SCANNING MAGNIFICATION | 0.00 % | 0.00 % | |

| | | | | | | |
|---|---|---|---|---|---|---|
| 603 | DEF-MANUFACTURED PAPER-SHEET EMBOSSED PAPER A-1 | 216 | 279 | 170 | EMBOSSED | WHITE | NO | RIGHT-ANGLE CORRECTION AMOUNT | -0.48 mm | 0.08 mm | 0 |
| | | | | | | | | TRAPEZOIDAL CORRECTION AMOUNT | 0.41 mm | 0.29 mm | |
| | | | | | | | | LEAD POSITION | 0.50 mm | -0.30 mm | |
| | | | | | | | | SIDE POSITION | -0.50 mm | 0.50 mm | |
| | | | | | | | | MAIN SCANNING MAGNIFICATION | +0.02 % | +0.01 % | |
| | | | | | | | | SUB SCANNING MAGNIFICATION | +0.02 % | -0.03 % | |
| 604 | DEF-MANUFACTURED PAPER-SHEET COATED PAPER P-1 | 279 | 432 | 128 | TWO-FACE COATED | WHITE | NO | RIGHT-ANGLE CORRECTION AMOUNT | 0.11 mm | 0.41 mm | +1 |
| | | | | | | | | TRAPEZOIDAL CORRECTION AMOUNT | -0.21 mm | -0.31 mm | |
| | | | | | | | | LEAD POSITION | 0.40 mm | -0.20 mm | |
| | | | | | | | | SIDE POSITION | -0.20 mm | 0.60 mm | |
| | | | | | | | | MAIN SCANNING MAGNIFICATION | +0.12 % | -0.02 % | |
| | | | | | | | | SUB SCANNING MAGNIFICATION | +0.08% | -0.01 % | |
| 605 | XYZ-MANUFACTURED PAPER-SHEET COLOR 81 | 210 | 297 | 75 | PLAIN PAPER | ORANGE | NO | RIGHT-ANGLE CORRECTION AMOUNT | 0.00 mm | 0.00 mm | 0 |
| | | | | | | | | TRAPEZOIDAL CORRECTION AMOUNT | 0.00 mm | 0.00 mm | |
| | | | | | | | | LEAD POSITION | 0.00 mm | 0.00 mm | |
| | | | | | | | | SIDE POSITION | 0.00 mm | 0.00 mm | |
| | | | | | | | | MAIN SCANNING MAGNIFICATION | 0.00 % | 0.00 % | |
| | | | | | | | | SUB SCANNING MAGNIFICATION | 0.00 % | 0.00 % | |

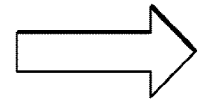

| | 611 | 612 | 613 | 614 | 615 | 616 | 617 | PRINT POSITION DEVIATION AMOUNT | | | 620 |
|---|---|---|---|---|---|---|---|---|---|---|---|
| | PAPER-SHEET NAME | SUB SCANNING DIRECTION PAPER-SHEET LENGTH (mm) | MAIN SCANNING DIRECTION PAPER-SHEET LENGTH (mm) | BASIS WEIGHT (g/m²) | SURFACE PROPERTY | COLOR | PREPRINTED PAPER | | 618 FRONT SURFACE | 619 BACK SURFACE | SECONDARY TRANSFERRING VOLTAGE ADJUSTMENT |
| 601 | ABC-MANUFACTURED PAPER-SHEET RECYCLE 1 | - | - | 75 | PLAIN PAPER | WHITE | NO | RIGHT-ANGLE CORRECTION AMOUNT | 0.00 mm | 0.00 mm | +5 |
| | | | | | | | | TRAPEZOIDAL CORRECTION AMOUNT | 0.00 mm | 0.00 mm | |
| | | | | | | | | LEAD POSITION | 0.00 mm | 0.00 mm | |
| | | | | | | | | SIDE POSITION | 0.00 mm | 0.00 mm | |
| | | | | | | | | MAIN SCANNING MAGNIFICATION | 0.00 % | 0.00 % | |
| | | | | | | | | SUB SCANNING MAGNIFICATION | 0.00 % | 0.00 % | |
| 606 | ABC-MANUFACTURED PAPER-SHEET RECYCLE 1_A4 | 210 | 297 | 75 | PLAIN PAPER | WHITE | NO | RIGHT-ANGLE CORRECTION AMOUNT | 0.21 mm | 0.20 mm | +5 |
| | | | | | | | | TRAPEZOIDAL CORRECTION AMOUNT | 0.51 mm | 0.45 mm | |
| | | | | | | | | LEAD POSITION | 0.50 mm | 0.20 mm | |
| | | | | | | | | SIDE POSITION | -0.30 mm | 0.40 mm | |
| | | | | | | | | MAIN SCANNING MAGNIFICATION | +0.02 % | +0.03 % | |
| | | | | | | | | SUB SCANNING MAGNIFICATION | +0.02 % | -0.01 % | |
| 608 | ABC-MANUFACTURED PAPER-SHEET RECYCLE 1_A3 | 420 | 297 | 75 | PLAIN PAPER | WHITE | NO | RIGHT-ANGLE CORRECTION AMOUNT | 0.23 mm | 0.27 mm | +5 |
| | | | | | | | | TRAPEZOIDAL CORRECTION AMOUNT | 0.71 mm | 0.55 mm | |
| | | | | | | | | LEAD POSITION | 0.30 mm | 0.20 mm | |
| | | | | | | | | SIDE POSITION | -0.10 mm | 0.10 mm | |
| | | | | | | | | MAIN SCANNING MAGNIFICATION | +0.02 % | +0.02 % | |
| | | | | | | | | SUB SCANNING MAGNIFICATION | +0.01 % | -0.03 % | |

|  |  | 820 MEASURED VALUE | 821 IDEAL VALUE | 822 PRINT POSITION DEVIATION AMOUNT |
|---|---|---|---|---|
| 801 | LEAD POSITION (FRONT SURFACE) | $\frac{(C) + (E)}{2}$ | 1 cm | MEASURED VALUE − IDEAL VALUE |
| 802 | SIDE POSITION (FRONT SURFACE) | $\frac{(F) + (J)}{2}$ | 1 cm | MEASURED VALUE − IDEAL VALUE |
| 803 | MAIN SCANNING MAGNIFICATION (FRONT SURFACE) | $\frac{((B)-(D)-(F))+((B)-(H)-(J))}{2}$ | MAIN SCANNING DIRECTION PAPER-SHEET LENGTH − 2 cm | (MEASURED VALUE − IDEAL VALUE) / IDEAL VALUE |
| 804 | SUB SCANNING MAGNIFICATION (FRONT SURFACE) | $\frac{((A)-(C)-(G))+((A)-(E)-(I))}{2}$ | SUB SCANNING DIRECTION PAPER-SHEET LENGTH − 2 cm | (MEASURED VALUE − IDEAL VALUE) / IDEAL VALUE |
| 805 | RIGHT-ANGLE CORRECTION AMOUNT (FRONT SURFACE) | $\frac{(S) + (T)}{2}$ | 0 cm | MEASURED VALUE |
| 806 | TRAPEZOIDAL CORRECTION AMOUNT (FRONT SURFACE) | ((B)−(D)−(F))−((B)−(H)−(J)) | 0 cm | MEASURED VALUE |
| 807 | LEAD POSITION (BACK SURFACE) | $\frac{(K) + (M)}{2}$ | 1 cm | MEASURED VALUE − IDEAL VALUE |
| 808 | SIDE POSITION (BACK SURFACE) | $\frac{(N) + (R)}{2}$ | 1 cm | MEASURED VALUE − IDEAL VALUE |
| 809 | MAIN SCANNING MAGNIFICATION (BACK SURFACE) | $\frac{((B)-(L)-(N))+((B)-(P)-(R))}{2}$ | MAIN SCANNING DIRECTION PAPER-SHEET LENGTH − 2 cm | (MEASURED VALUE − IDEAL VALUE) / IDEAL VALUE |
| 810 | SUB SCANNING MAGNIFICATION (BACK SURFACE) | $\frac{((A)-(K)-(O))+((A)-(M)-(Q))}{2}$ | SUB SCANNING DIRECTION PAPER-SHEET LENGTH − 2 cm | (MEASURED VALUE − IDEAL VALUE) / IDEAL VALUE |
| 811 | RIGHT-ANGLE CORRECTION AMOUNT (BACK SURFACE) | $\frac{(U) + (V)}{2}$ | 0 cm | MEASURED VALUE |
| 812 | TRAPEZOIDAL CORRECTION AMOUNT (BACK SURFACE) | ((B)−(L)−(N))−((B)−(P)−(R)) | 0 cm | MEASURED VALUE |

FIG.8

PRINT POSITION ADJUSTMENT — 1000

SELECT CASSETTE | CASSETTE 1: A4: ABC-MANUFACTURED PAPER-SHEET RECYCLE 1 ▼ — 1001

| | FRONT SIDE | BACK SIDE |
|---|---|---|
| C | 0.00 mm | 0.00 mm |
| D | 0.00 mm | 0.00 mm |
| E | 0.00 mm | 0.00 mm |
| F | 0.00 mm | 0.00 mm |
| G | 0.00 mm | 0.00 mm |
| H | 0.00 mm | 0.00 mm |
| I | 0.00 mm | 0.00 mm |
| J | 0.00 mm | 0.00 mm |

1002

LEADING END SIDE
TRAILING END SIDE

1005 PRINT AND MEASURE | 1006 PRINT | 1007 MEASURE | 1003 APPLY | 1004 CANCEL

| JOB PRINT APPLICATION | | | | | | | | |
|---|---|---|---|---|---|---|---|---|
| JOB NAME | NUMBER OF PAGES | NUMBER OF PRINTS | SIMPLEX/ DUPLEX | | JOB ACTION | PRINT | RIP | JOB PROPERTY |
| PRINT JOB 1 | 50 | 100 | DUPLEX | | | | ☑ ADJUST PRINT POSITION | |
| PRINT JOB 2 | 20 | 50 | SIMPLEX | | | | | |

| FIG.16 |
|--------|
| FIG.16A |
| FIG.16B |
| FIG.16C |

FIG.16A

PAPER-SHEET LIBRARY

| | 611 | 612 | 613 | 614 | 615 | 616 | 617 | \| 618 | 619 \| | 620 |
|---|---|---|---|---|---|---|---|---|---|---|
| | PAPER-SHEET NAME | SUB SCANNING DIRECTION PAPER-SHEET LENGTH (mm) | MAIN SCANNING DIRECTION PAPER-SHEET LENGTH (mm) | BASIS WEIGHT (g/m²) | SURFACE PROPERTY | COLOR | PREPRINTED PAPER | PRINT POSITION DEVIATION AMOUNT | | SECONDARY TRANSFERRING VOLTAGE ADJUSTMENT |
| | | | | | | | | | FRONT SURFACE | BACK SURFACE | |
| 601 | ABC-MANUFACTURED PAPER-SHEET RECYCLE 1 | - | - | 75 | PLAIN PAPER | WHITE | NO | RIGHT-ANGLE CORRECTION AMOUNT | 0.00 mm | 0.00 mm | +5 |
| | | | | | | | | TRAPEZOIDAL CORRECTION AMOUNT | 0.00 mm | 0.00 mm | |
| | | | | | | | | LEAD POSITION | 0.00 mm | 0.00 mm | |
| | | | | | | | | SIDE POSITION | 0.00 mm | 0.00 mm | |
| | | | | | | | | MAIN SCANNING MAGNIFICATION | 0.00 % | 0.00 % | |
| | | | | | | | | SUB SCANNING MAGNIFICATION | 0.00 % | 0.00 % | |
| 602 | ABC-MANUFACTURED PAPER-SHEET RECYCLE 2 | 297 | 420 | 75 | PLAIN PAPER | WHITE | NO | RIGHT-ANGLE CORRECTION AMOUNT | 0.00 mm | 0.00 mm | -2 |
| | | | | | | | | TRAPEZOIDAL CORRECTION AMOUNT | 0.00 mm | 0.00 mm | |
| | | | | | | | | LEAD POSITION | 0.00 mm | 0.00 mm | |
| | | | | | | | | SIDE POSITION | 0.00 mm | 0.00 mm | |
| | | | | | | | | MAIN SCANNING MAGNIFICATION | 0.00 % | 0.00 % | |
| | | | | | | | | SUB SCANNING MAGNIFICATION | 0.00 % | 0.00 % | |

| | | | | | | RIGHT-ANGLE CORRECTION AMOUNT | -0.48 mm | 0.08 mm | |
|---|---|---|---|---|---|---|---|---|---|
| 603 | DEF-MANUFACTURED PAPER-SHEET EMBOSSED PAPER A-1 | 216 | 279 | 170 | EMBOSSED | WHITE | NO | TRAPEZOIDAL CORRECTION AMOUNT | 0.41 mm | 0.29 mm | 0 |
| | | | | | | | | LEAD POSITION | 0.50 mm | -0.30 mm | |
| | | | | | | | | SIDE POSITION | -0.50 mm | 0.50 mm | |
| | | | | | | | | MAIN SCANNING MAGNIFICATION | +0.02 % | +0.01 % | |
| | | | | | | | | SUB SCANNING MAGNIFICATION | +0.02 % | -0.03 % | |
| 604 | DEF-MANUFACTURED PAPER-SHEET COATED PAPER P-1 | 279 | 432 | 128 | TWO-FACE COATED | WHITE | NO | RIGHT-ANGLE CORRECTION AMOUNT | 0.11 mm | 0.41 mm | +1 |
| | | | | | | | | TRAPEZOIDAL CORRECTION AMOUNT | -0.21 mm | -0.31 mm | |
| | | | | | | | | LEAD POSITION | 0.40 mm | -0.20 mm | |
| | | | | | | | | SIDE POSITION | -0.20 mm | 0.60 mm | |
| | | | | | | | | MAIN SCANNING MAGNIFICATION | +0.12 % | -0.02 % | |
| | | | | | | | | SUB SCANNING MAGNIFICATION | +0.08% | -0.01 % | |
| 605 | XYZ-MANUFACTURED PAPER-SHEET COLOR 81 | 210 | 297 | 75 | PLAIN PAPER | ORANGE | NO | RIGHT-ANGLE CORRECTION AMOUNT | 0.00 mm | 0.00 mm | 0 |
| | | | | | | | | TRAPEZOIDAL CORRECTION AMOUNT | 0.00 mm | 0.00 mm | |
| | | | | | | | | LEAD POSITION | 0.00 mm | 0.00 mm | |
| | | | | | | | | SIDE POSITION | 0.00 mm | 0.00 mm | |
| | | | | | | | | MAIN SCANNING MAGNIFICATION | 0.00 % | 0.00 % | |
| | | | | | | | | SUB SCANNING MAGNIFICATION | 0.00 % | 0.00 % | |

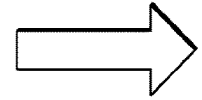

FIG.16B

| PAPER-SHEET NAME | SUB SCANNING DIRECTION PAPER-SHEET LENGTH (mm) | MAIN SCANNING DIRECTION PAPER-SHEET LENGTH (mm) | BASIS WEIGHT (g/m²) | SURFACE PROPERTY | COLOR | PREPRINTED PAPER | PRINT POSITION DEVIATION AMOUNT | | | SECONDARY TRANSFERRING VOLTAGE ADJUSTMENT |
|---|---|---|---|---|---|---|---|---|---|---|
| | | | | | | | | FRONT SURFACE | BACK SURFACE | |
| ABC-MANUFACTURED PAPER-SHEET RECYCLE 1 | - | - | 75 | PLAIN PAPER | WHITE | NO | A4 | | | +5 |
| | | | | | | | RIGHT-ANGLE CORRECTION AMOUNT | 0.21 mm | 0.20 mm | |
| | | | | | | | TRAPEZOIDAL CORRECTION AMOUNT | 0.51 mm | 0.45 mm | |
| | | | | | | | LEAD POSITION | 0.50 mm | 0.20 mm | |
| | | | | | | | SIDE POSITION | -0.30 mm | 0.40 mm | |
| | | | | | | | MAIN SCANNING MAGNIFICATION | +0.02 % | +0.03 % | |
| | | | | | | | SUB SCANNING MAGNIFICATION | +0.02 % | -0.01 % | |
| | | | | | | | A3 | | | |
| | | | | | | | RIGHT-ANGLE CORRECTION AMOUNT | 0.23 mm | 0.27 mm | |
| | | | | | | | TRAPEZOIDAL CORRECTION AMOUNT | 0.71 mm | 0.55 mm | |
| | | | | | | | LEAD POSITION | 0.30 mm | 0.20 mm | |
| | | | | | | | SIDE POSITION | -0.10 mm | 0.10 mm | |
| | | | | | | | MAIN SCANNING MAGNIFICATION | +0.02 % | +0.02 % | |
| | | | | | | | SUB SCANNING MAGNIFICATION | +0.01 % | -0.03 % | |
| | | | | | | | — | | | |
| | | | | | | | RIGHT-ANGLE CORRECTION AMOUNT | 0.00 mm | 0.00 mm | |
| | | | | | | | TRAPEZOIDAL CORRECTION AMOUNT | 0.00 mm | 0.00 mm | |
| | | | | | | | LEAD POSITION | 0.00 mm | 0.00 mm | |
| | | | | | | | SIDE POSITION | 0.00 mm | 0.00 mm | |
| | | | | | | | MAIN SCANNING MAGNIFICATION | 0.00 % | 0.00 % | |
| | | | | | | | SUB SCANNING MAGNIFICATION | 0.00 % | 0.00 % | |

IMAGE FORMATION APPARATUS AND STORING MEDIUM

BACKGROUND OF THE INVENTION

Field of the Invention

The present invention relates to an image formation apparatus and a storing medium and especially relates to an image formation apparatus and a storing medium that adjust an image formation position with respect to a printing medium. The image formation apparatus is used as a copier, a printer, a FAX, or another apparatus having a function of image formation.

Description of the Related Art

There has been known an image formation apparatus that adjusts a print position (image formation position) with respect to a printing medium (for example, a paper-sheet or a sheet) such that an image is formed at an intended position on the printing medium. Such an apparatus is capable of adjusting print positions in duplex printing to align the print positions of images on a front side and a back side of the printing medium, for example. Additionally, in a case of printing an image on a printing medium (preprinted paper or the like) on which ruled lines or the like are printed in advance, the above-described apparatus is capable of printing the image without overlapping the image on the ruled lines by adjusting the print position.

One of the methods of adjusting the print position may be, for example, a method including: forming front-back adjustment marks on a paper-sheet; scanning the front-back adjustment marks; and applying a correction amount obtained based on the scanned result to the printing (Japanese Patent Laid-Open No 2018-124455 (hereinafter, PTL 1)). For example, the image formation apparatus disclosed in PTL 1 performs the front-back adjustment of images by calculating the correction value based on an amount of the deviation from setting values of the front-back adjustment marks and adjusting image formation positions on the two sides based on the correction value.

Additionally, in PTL 1, it is possible to use a database called a paper-sheet library, which records and manages a basis weight and material by each paper-sheet name, to register the correction amount for each of the paper-sheet data categorized by the paper-sheet names recorded in the paper-sheet library. If the correction amount is registered for each of the paper-sheet data in a case of using a cassette for the printing, it is possible to perform the printing reflecting the correction amount registered for the paper-sheet data only by setting the paper-sheets in the cassette and associating the cassette with the paper-sheet data.

Note that, the image formation apparatus to which the paper-sheet library as disclosed in PTL 1 is adopted may be used without setting paper-sheet size information as the paper-sheet data purposefully. For example, the same paper-sheet data with the paper-sheet size unspecified may be set to a cassette 1 in which an A4-paper-sheet is set and a cassette 2 in which an A3-paper-sheet is set. This method of using the image formation apparatus has an advantage that it is possible to easily manage different paper-sheets having the same attributes except for the paper-sheet size with the same paper-sheet data.

However, in the case where the image formation apparatus is used with the correction amount for the print position deviation registered to the paper-sheet data, it is desirable to specify the paper-sheet size. This is because, since the correction amount for the print position deviation depends on a cut shape of each cut paper-sheet, there may be a case that the print position deviation gets worse with the same correction amount applied to paper-sheets cut by different cutting methods, like paper-sheets in different sizes.

SUMMARY OF THE INVENTION

The present invention is an image formation apparatus, including: a paper-sheet storage unit configured to be capable of managing a stored paper-sheet by using paper-sheet size information and paper-sheet attribute data. The image formation apparatus includes: a unit configured to obtain second paper-sheet attribute data that is created based on first paper-sheet attribute data in which the paper-sheet size information is not set once an event in which an adjustment value of a print position is registered to the first paper-sheet attribute data occurs, the second paper-sheet attribute data including the adjustment value and first paper-sheet size registered thereto.

Further features of the present invention will become apparent from the following description of exemplary embodiments with reference to the attached drawings.

BRIEF DESCRIPTION OF THE DRAWINGS

FIG. 5 is a schematic diagram illustrating an interface screen used by the operator to edit a paper-sheet attribute;

FIG. 6 is a diagram showing the relationship of FIGS. 6A to 6C;

FIGS. 6A to 6C are totally a diagram describing a transition of the paper-sheet library;

FIG. 8 is a diagram illustrating a list of methods of calculating a print position deviation amount based on an actual measured value of the adjustment image;

FIG. 10 is a diagram illustrating a print position adjustment screen;

FIG. 13 is a diagram illustrating an application screen of a host computer;

FIG. 16 is a diagram showing the relationship of FIGS. 16A to 16C;

FIGS. 16A to 16C are totally a diagram describing a transition of the paper-sheet library;

DESCRIPTION OF THE EMBODIMENTS

Hereinafter, embodiments of the present invention are described with reference to the drawings. The configurations for implementing the present invention are not limited to the configurations described herein. A part of the configurations may be omitted or replaced with an equivalent as long as similar effects can be obtained.

<Image Formation System>

An image formation system including multiple devices is described as an example of a configuration as a precondition for implementing the present invention.

Figure 1:
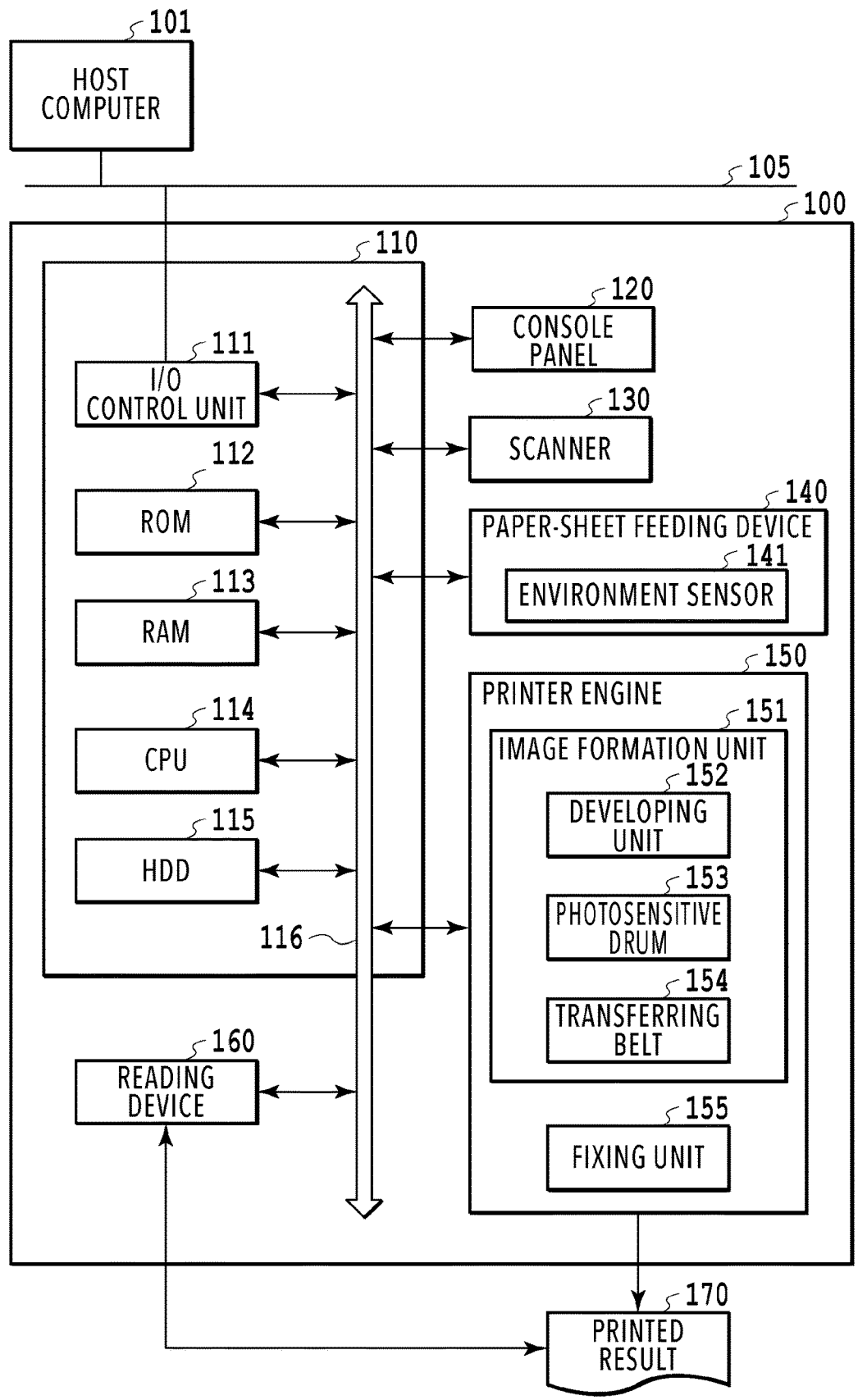
FIG. 1 is a block diagram illustrating a hardware configuration of an image formation system.

FIG. 1 is a block diagram illustrating a schematic configuration of hardware of the image formation system. As illustrated in FIG. 1, the image formation system according to the present embodiment includes a printing apparatus 100 (an image formation apparatus or an MFP) and a host computer 101 (an information processing device or a PC). The printing apparatus 100 and the host computer 101 are communicably connected to each other through a communication line 105 (for example, a LAN). Although the host computer 101 and the printing apparatus 100 are connected to each other one to one in the image formation system of the present embodiment, the image formation system may include multiple host computers 101 and multiple printing apparatuses 100 connected to each other.

The host computer 101 can obtain information inputted by an operator through a not-illustrated input device, create a print job to be transmitted to the printing apparatus 100, and transmit the created print job to the printing apparatus 100.

The printing apparatus 100 includes a controller board 110, a console panel 120, a scanner 130, a paper-sheet feeding device 140, a printer engine 150, and a reading device 160. The constituents in the printing apparatus 100 are communicably connected to each other through a bus 116.

The controller board 110 is a control unit that performs various data processings and controls operations of the printing apparatus 100. The console panel 120 includes an LCD that displays information and a touch sensor that detects a touch operation, and the console panel 120 is an operation unit that accepts various operations by the operator through the touch panel. The scanner 130 is a reading unit that scans a manuscript document by using an optical sensor and obtains scanned image data. The paper-sheet feeding device 140 is a feeding unit (a paper-sheet storage unit) including multiple cassettes. Each cassette can store various printing paper-sheets. Each cassette includes a not-illustrated sensor that determines whether a paper-sheet is set in the cassette. If a paper-sheet is set therein, the cassette can separate only a top sheet of the stored paper-sheets and convey to the printer engine 150. The printer engine 150 is an image formation unit that physically prints image data on a printing paper-sheet. The reading device 160 controls reading of a printed result 170 printed by the printer engine 150 and feedback to the controller board 110. The reading device 160 is described in detail later with reference to FIG. 3.

<Controller>

Next, a configuration of the controller board 110 is described. An I/O control unit 111 is a communication unit that controls communications with an external network. A ROM 112 is a memory that stores various control programs. A RAM 113 is a memory that reads and records the control programs stored in the ROM 112. A CPU 114 is a processor that executes the control programs read by the RAM 113 and controls overall image signals and various devices. An HDD 115 is a storing medium that is used for holding massive data including image data and print data temporarily or long-term. The modules are connected to each other through the system bus 116. The system bus 116 also connects a controller box and the devices in the printing apparatus 100 with each other. The RAM 113 also serves as a main memory or a work memory of the CPU 114. The control programs and operating systems are stored in not only the ROM 112 but also in the HDD 115. A not-illustrated NVRAM may also be applied to store printing apparatus mode setting information inputted through the console panel 120.

<Printer Engine>

Next, a configuration of the printer engine 150 is described. An image formation unit 151 includes a developing unit 152, a photosensitive drum 153, and a transferring belt 154. According to the image data generated by the controller board 110, the image formation unit 151 forms a toner image around the photosensitive drum 153 by using the developing unit 152 and transfers the formed toner image onto the printing paper-sheet conveyed on the transferring belt 154. The image formation unit 151 is described in detail later with reference to FIG. 2. A fixing unit 155 fixes the toner image that is transferred on the printing paper-sheet by the image formation unit 151. The fixing unit 155 includes not-illustrated pressing roller and heating roller and fixes the toner image on the printing paper-sheet with the toner melting and being pressed while the paper-sheet is passing through between the rollers.

Figure 2:
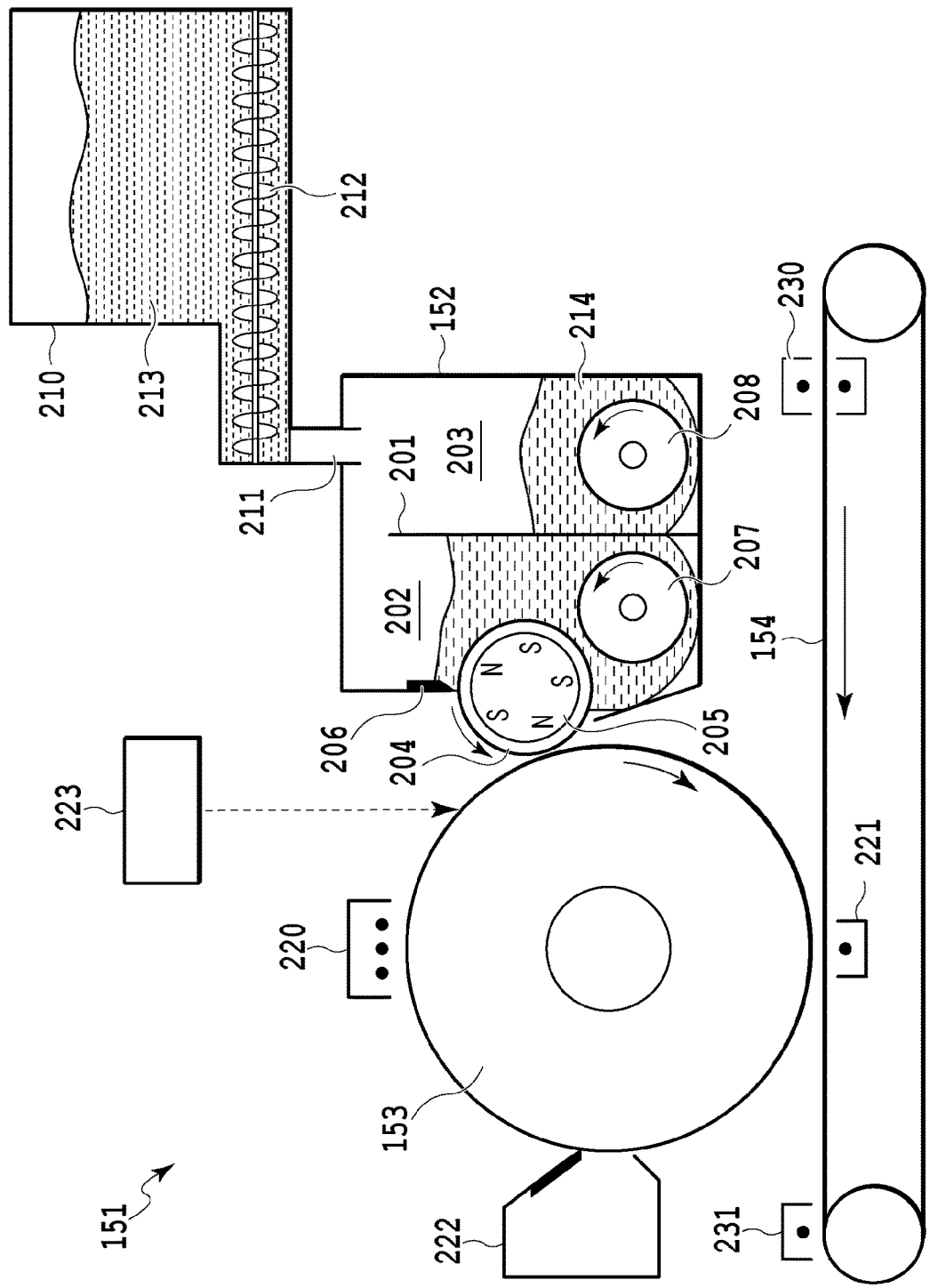
FIG. 2 is a schematic diagram illustrating a configuration of an image formation unit.

FIG. 2 is a schematic diagram illustrating a configuration of the image formation unit 151. As illustrated in FIG. 2, the developing unit 152 is arranged facing the photosensitive drum 153, and the inside of the developing unit 152 is separated into a developing chamber 202 and an agitation chamber 203 by a perpendicularly extending separation wall 201. In the developing chamber 202, a non-magnetic developing sleeve 204 that rotates in a direction indicated by an arrow is arranged, and magnets 205 are arranged and fixed in the developing sleeve 204. The developing sleeve 204 carries and conveys a layer of two-component developer (including magnetic carrier and non-magnetic toner) that has a layer thickness restricted by a blade 206, and the developing sleeve 204 supplies the photosensitive drum 153 with the developer in a developing region facing the photosensitive drum 153 to develop an electrostatic latent image on the photosensitive drum 153. In order to improve the developing efficiency or the percentage of the toner to be applied to the electrostatic latent image, a developing bias voltage obtained by superimposing a direct-current voltage to an alternating-current voltage is applied to the developing sleeve 204. The developing chamber 202 and the agitation chamber 203 are provided with developer agitation screws 207 and 208, respectively. The screw 207 agitates and conveys the developer in the developing chamber 202. The screw 208 agitates and conveys toner 213 supplied from a toner discharge port 211 of a toner supply tank 210 by the rotation of a conveyance screw 212 and developer 214 already existing in the developing unit 152 to homogenize the toner density. In the separation wall 201, (not-illustrated) developer passages that allow the developing chamber 202 and the agitation chamber 203 to communicate with each other at end portions on the near side and the far side in FIG. 2. The developer in the developing chamber 202 in which the toner is consumed by the developing and the toner density is decreased is moved from one developer passage into the agitation chamber 203 by the conveyance force of the screws 207 and 208. Then, the developer with the toner density recovered in the agitation chamber 203 is moved from the other developer passage into the developing chamber 202.

The photosensitive drum 153 is rotated and driven in a direction indicated by an arrow in FIG. 2. In the periphery of the photosensitive drum 153, a primary charger 220 that uniformly charges the photosensitive drum 153, the developing unit 152, a transferring charger 221 that transfers the developed visible toner image onto the printing paper-sheet, and a drum cleaner 222 are arranged in this order in the photosensitive drum rotation direction.

An image exposure device 223 is provided above the photosensitive drum 153. The image exposure device 223 includes a semiconductor laser, a polygon mirror, a reflector, and the like, and in response to an input of a digital pixel signal (video data) corresponding to an image converted to the digital signal by the controller board 110, the image exposure device 223 emits a laser beam modulated according to the signal. The image exposure device 223 emits the laser beam to perform scanning in the bus direction of the photosensitive drum 153 between the primary charger 220 and the developing unit 152 and exposes the drum surface of the photosensitive drum 153 to form the electrostatic latent image. Thereafter, the photosensitive drum 153 is rotated, and thus the developing unit 152 develops the electrostatic latent image as the visible toner image.

The endless transferring belt 154 that conveys the printing paper-sheet in a direction indicated by an arrow in FIG. 2 is arranged to be suspended between multiple rollers below the photosensitive drum 153. The printing paper-sheet fed by the paper-sheet feeding device 140 is fed from the right side of the transferring belt 154, carried by the transferring belt 154 by the function of adsorption chargers 230 provided across the transferring belt 154 to face each other, and conveyed to the left side. In the moment in which the printing paper-sheet passes between the photosensitive drum 153 and the transferring charger 221, the visible toner image developed on the photosensitive drum 153 is transferred onto the printing paper-sheet by the function of the transferring charger 221. The printing paper-sheet on which the toner image is transferred is separated from the transferring belt 154 by a neutralization charger 231 and conveyed to the not-illustrated fixing unit 155. The toner remaining on the photosensitive drum 153 after the toner is transferred on the printing paper-sheet is removed by the drum cleaner 222.

<Paper-Sheet Feeding Device>

Figure 3:
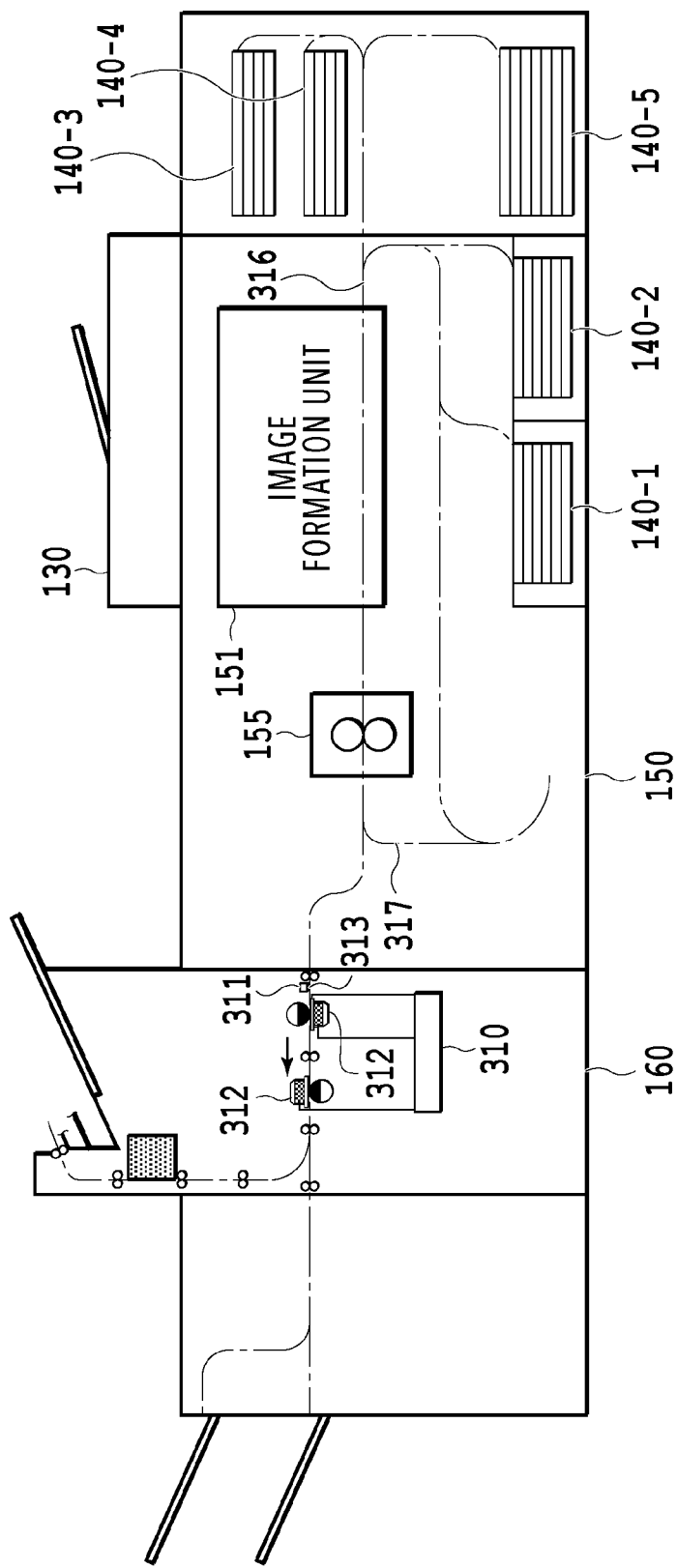
FIG. 3 is a schematic diagram illustrating an arrangement configuration of a printing apparatus.

FIG. 3 illustrates a cross-sectional view of the printer engine 150 and the reading device 160 on the paper-sheet conveyance path. The printer engine 150 includes a cassette 1 (140-1), a cassette 2 (140-2), a cassette 3 (140-3), a cassette 4 (140-4), and a cassette 5 (140-5) that serve as the paper-sheet feeding device 140. An A4-paper-sheet is set in the cassette 1, for example, and an A3-paper-sheet is set in the cassette 2, for example. Then, a paper-sheet is fed from a cassette holding the corresponding paper-sheet that is appropriate for the printing contents. The fed paper-sheet passes through a paper-sheet conveyance path 316 such that the toner is transferred onto the top surface, and thereafter the toner is fixed by the fixing unit 155. In the simplex printing, the paper-sheet is directly discharged to the outside of the printer engine 150. Since the reading device 160 is connected in this example, the paper-sheet is conveyed to a paper-sheet conveyance path 313 in the reading device 160. In the duplex printing, the paper-sheet is conveyed to a two-surfaces conveyance path 317 and inverted to return to the paper-sheet conveyance path 316 such that the printing is performed on the back side, and finally the paper-sheet is conveyed to the paper-sheet conveyance path 313 in the reading device 160.

<Reading Device>

The reading device 160 includes a reading controller unit 310, a paper detection sensor 311, and a line sensor 312. The printed product to be read (the paper-sheet on which an adjustment image is formed) passes through the paper-sheet conveyance path 313, and the paper detection sensor 311 detects the printed product. The paper-sheet conveyance path 313 includes a black paper conveyance belt (a conveyance unit). The paper detection sensor 311 uses the black paper conveyance belt to detect whether there is the printed product by capturing a paper end of the white printed product passing through the paper-sheet conveyance path 313.

Here are arranged multiple paper detection sensors 311 aligned in a direction perpendicular to the paper conveyance direction, and the paper detection sensors 311 detect whether there is the printed product at each position and obtain the time when the printed product passes therethrough. The reading controller unit 310 computes a skew angle of the printed product using the conveyance speed of the paper conveyance belt based on the information on variation in existence of the printed product and the time when the leading paper end of the printed product passes through, which are transmitted from each paper detection sensor 311. Next, the reading controller unit 310 controls the line sensor 312 to read the image data of the printed product by using the signal detecting whether there is the paper as a trigger. Two line sensors 312 are provided above and below the paper-sheet conveyance path so as to be capable of reading both the front side the back side. Then, the line sensors 312 transmits correction value information, which is calculated based on the skew angle of the printed product computed in advance and adjustment marks included in the image data read by the line sensor, to the controller board 110.

Embodiment 1

In the image formation system having the configurations described in FIGS. 1 to 3, in Embodiment 1, an event in which an adjustment value for the print position deviation is manually inputted to the paper-sheet profile with the paper-sheet size unspecified occurs. Then, in this event in Embodiment 1, the paper-sheet profile with the paper-sheet size specified is created.

<Utilization Sequence>

Figure 17:
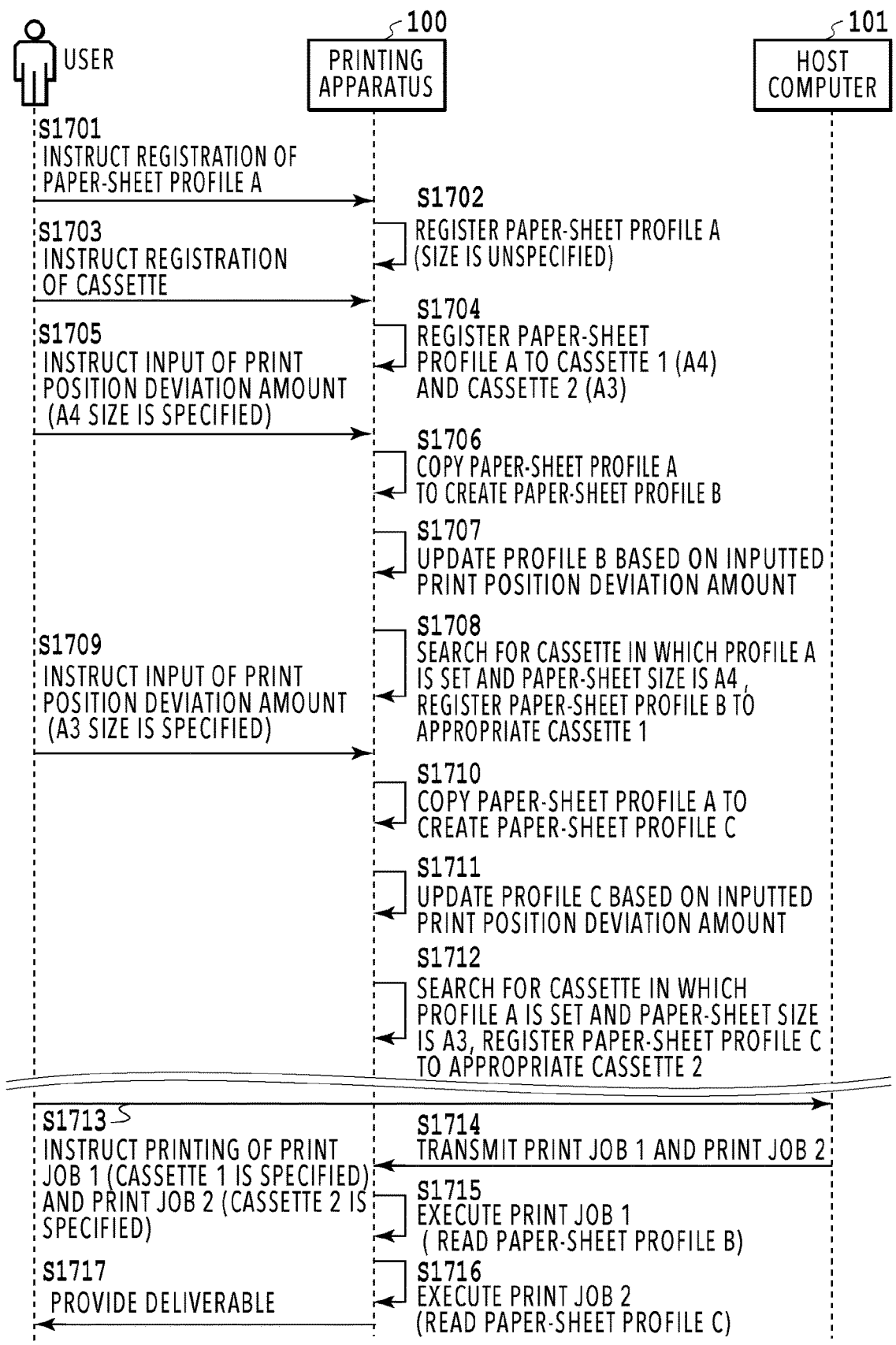
FIG. 17 is a sequence diagram of a case where the print position deviation amount is inputted to a paper-sheet profile with the size unspecified.

First, the whole procedure of the present embodiment is described with reference to FIG. 17. FIG. 17 is a sequence diagram of a case where a print position deviation amount is inputted to a paper-sheet profile with the size unspecified. In the present embodiment, the processings are performed between mainly the user, the printing apparatus 100, and the host computer 101 as illustrated in FIG. 17.

Once the registration of a paper-sheet profile is instructed in step 1701 (hereinafter, written like S1701), the printing apparatus 100 registers a paper-sheet profile A with the paper-sheet size unspecified in S1702.

Once the user instructs the registration to a cassette in S1703, the printing apparatus 100 registers the paper-sheet profile A to the cassette 1 and the cassette 2 in S1704. In this process, since the size is unspecified in the paper-sheet profile A, the paper-sheet profile A can be used in both the cassette 1 and the cassette 2 simultaneously.

In S1705, the user instructs the input of the print position deviation amount to the paper-sheet profile A. In this process, the input of the size information of the paper-sheet is indispensable. In this case, A4-size is specified.

In S1706, the printing apparatus 100 copies the paper-sheet profile A (for example, "ABC-manufactured paper-sheet recycle 1") to create a paper-sheet profile B (for example, "ABC-manufactured paper-sheet recycle 1_A4").

In S1707, the printing apparatus 100 applies the inputted print position deviation amount to the paper-sheet profile B to update the information.

In S1708, the printing apparatus 100 searches for a cassette to which the paper-sheet profile A is registered and to which the size (in this case, A4) that is inputted during the input of the print position deviation amount is registered. In this case, the cassette 1 is appropriate, and thus the paper-sheet profile B is registered to the cassette 1.

In S1709, the input of the print position deviation amount to the paper-sheet profile A is instructed. In this process, the input of the size information of the paper-sheet is indispensable. In this case, A3-size is specified.

In S1710, the printing apparatus 100 copies the paper-sheet profile A (for example, "ABC-manufactured paper-sheet recycle 1") to create a paper-sheet profile C (for example, "ABC-manufactured paper-sheet recycle 1_A3").

In S1711, the printing apparatus 100 applies the inputted print position deviation amount to the paper-sheet profile C to update the information.

In S1712, the printing apparatus 100 searches for a cassette to which the paper-sheet profile A is registered and to which the size (in this case, A3) that is inputted during the input of the print position deviation amount is registered. In this case, the cassette 2 is appropriate, and thus the paper-sheet profile C is registered to the cassette 2.

In the present embodiment, the registration of the paper-sheet profile and the cassette is performed as described above. Then, the registered information is used to perform the image formation as described below.

In S1713, the user instructs the host computer 101 to execute a print job 1 specifying the cassette 1 and a print job 2 specifying the cassette 2.

In S1714, the host computer 101 transmits the print job 1 and the print job 2 to the printing apparatus 100.

In S1715, the printing apparatus 100 executes the print job 1 by using the paper-sheet in the cassette 1. In this process, the paper-sheet profile B registered to the cassette 1 is read, and the print position deviation amount in the paper-sheet profile B is applied to the execution of the print job 1.

In S1716, the printing apparatus 100 executes the print job 2 by using the paper-sheet in the cassette 2. In this process, the paper-sheet profile C registered to the cassette 2 is read, and the print position deviation amount in the paper-sheet profile C is applied to the execution of the print job 2.

In S1717, the printing apparatus 100 provides the user with the deliverable generated by executing the print job 1 and the print job 2.

<Editing of Paper-Sheet Library>

The information (the paper-sheet profile) on the paper-sheet to be used for the printing by the printing apparatus 100 is managed by the operator (the user) by using a database called a paper-sheet library. In a case where the paper-sheet profile is registered as described in S1701 and S1702, the paper-sheet library is edited. The paper-sheet library is stored in the HDD 115 or the RAM 113 and is read and written by each software module as needed. The specific configuration of the paper-sheet library is described later with reference to FIG. 6A to 6C.

Figure 4:
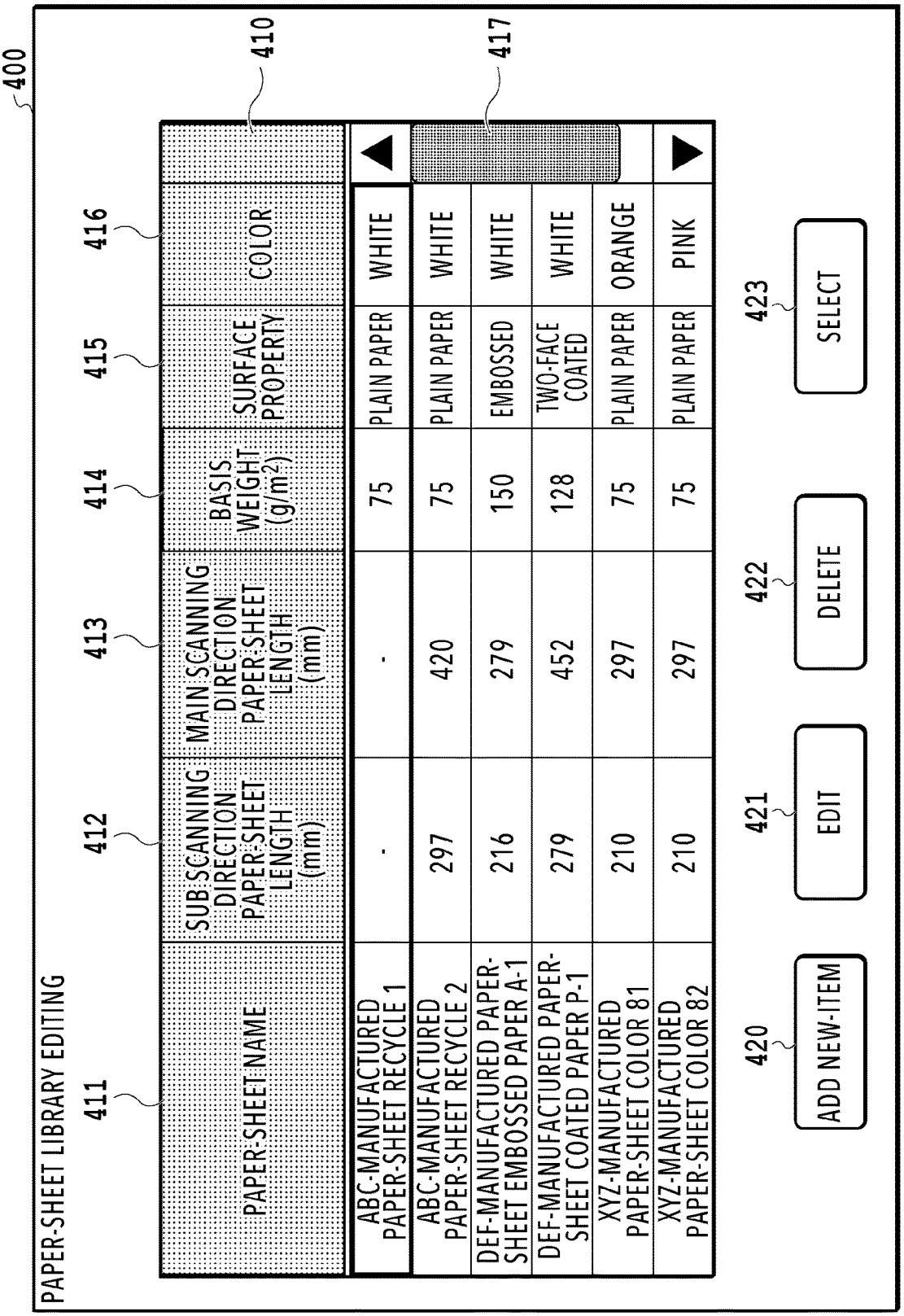
FIG. 4 is a schematic diagram illustrating an interface used by an operator to operate a paper-sheet library.

FIG. 4 is a schematic diagram illustrating an interface used by the operator to operate the paper-sheet library. A screen 400 represents the overall interface screen that the CPU 114 displays on the console panel 120. The screen 400 includes a paper-sheet list 410, a add new-item button 420, an edit button 421, a delete button 422, and a select button 423.

The paper-sheet list 410 is a region that displays a list of the paper-sheets stored in the paper-sheet library. In the paper-sheet list 410, paper-sheet attributes of the paper-sheets as indicated in columns 411 to 416 are presented as accompanying information. The column 411 indicates a paper-sheet name of each paper-sheet. The paper-sheet name is a name specified by the operator or the like to identify the different paper-sheets. The column 412 and the column 413 respectively indicate a sub scanning direction paper-sheet length and a main scanning direction paper-sheet length of each paper-sheet. The column 414 indicates a basis weight of each paper-sheet. The column 415 indicates the surface property of each paper-sheet. The surface property herein is an attribute representing the physical property of the paper-sheet front side including, for example, "coating" with which coating is applied on the front side to enhance the glossiness and "embossing" with which the front side is made bumpy. The column 416 indicates a color of each paper-sheet (a color of the paper-sheet itself). The operator can select a paper-sheet by touching a portion in which an arbitrary paper-sheet is displayed in the paper-sheet list 410 on the console panel 120. The selected paper-sheet is emphatically displayed (displayed with a bold frame). FIG. 4 illustrates a situation where "ABC-manufactured paper-sheet recycle 1" is selected as an example. If the number of the types of paper-sheet recorded in the paper-sheet library is more than the number that can be displayed at one time in the paper-sheet list 410, the overflowed paper-sheet information is put outside the screen. The paper-sheet information outside the screen can be shown up by using a scroll bar 417.

The add new-item button 420 is a button used to add a new paper-sheet to the paper-sheet library. The edit button 421 is a button used to edit the paper-sheet attribute of the paper-sheet selected in the paper-sheet list 410. The delete button 422 is a button used to delete the paper-sheet selected in the paper-sheet list 410 from the paper-sheet library. The select button 423 is a button used to register the paper-sheet selected in the paper-sheet list 410 to a cassette.

Once the add new-item button 420 is selected, a screen for editing the paper-sheet attribute of the registered paper-sheet is displayed, and after the attribute information is inputted, paper-sheet attribute data named "ABC-manufactured paper-sheet recycle 1" can be registered. In the present embodiment, as described in S1701 and S1702, it is possible to register the paper-sheet attribute data while leaving the column 412 and the column 413 empty or without specifying the paper-sheet size.

Once the paper-sheet attribute data is registered, the paper-sheet library is updated. FIGS. 6A to 6C are totally a schematic diagram illustrating the paper-sheet library stored in the HDD 115 and the like. Although the schematic diagram is used for the sake of description, the paper-sheet library is actually stored in the form of digital information such as XML and CSV.

Rows 601 to 605 are information spaces for the respective paper-sheets registered to the paper-sheet library. Columns 611 to 620 indicate the paper-sheet attributes of the paper-sheets specified by the operator. The column 611 indicates the paper-sheet name. The columns 612 to 615 indicate the paper-sheet attributes representing the physical properties of the paper-sheet and respectively indicate the sub scanning direction paper-sheet length, the main scanning direction paper-sheet length, the basis weight, and the surface property. The column 616 indicates the color of the paper-sheet, and the column 617 indicates whether the paper-sheet is preprinted paper.

The columns 618 and 619 respectively indicate the print position deviation amounts on the front side and the back side of each paper-sheet. If it is right after the new paper-sheet attribute data is registered to the paper-sheet library or if the print position is not adjusted yet although the paper-sheet is already registered, an initial value is used as the print position deviation amount. In this case, the initial value of each item is "0". The column 620 indicates an adjustment value for the voltage of secondary transferring. The secondary transferring voltage is fine-tuned to an optimum voltage depending on the properties of the paper-sheet such as the basis weight and the surface property so that a proper amount of toner is adsorbed onto the paper-sheet.

<Registration of Cassette>

Figure 9A:
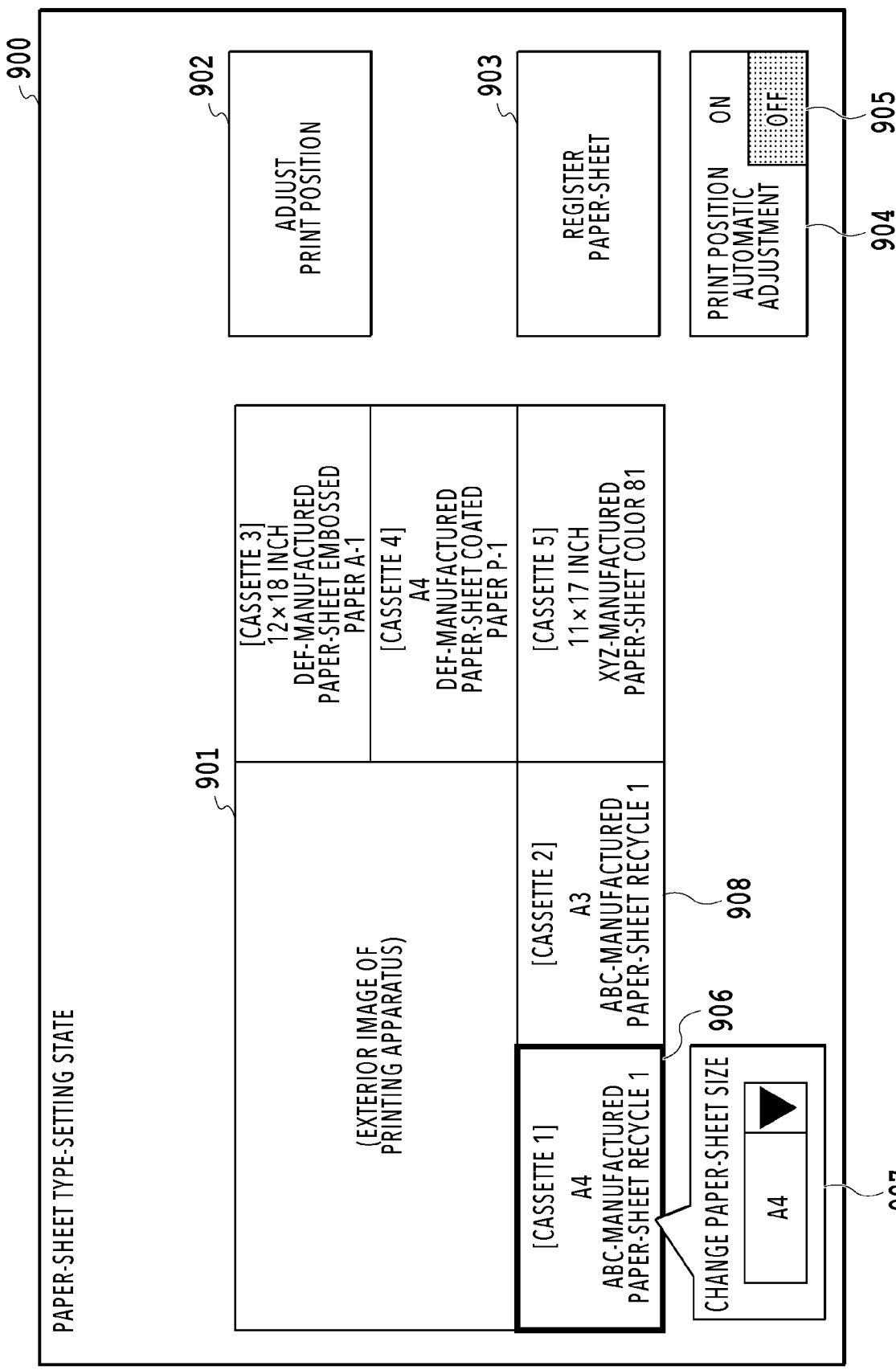
FIG. 9A is a diagram illustrating a paper-sheet type-setting state screen.
Figure 9B:
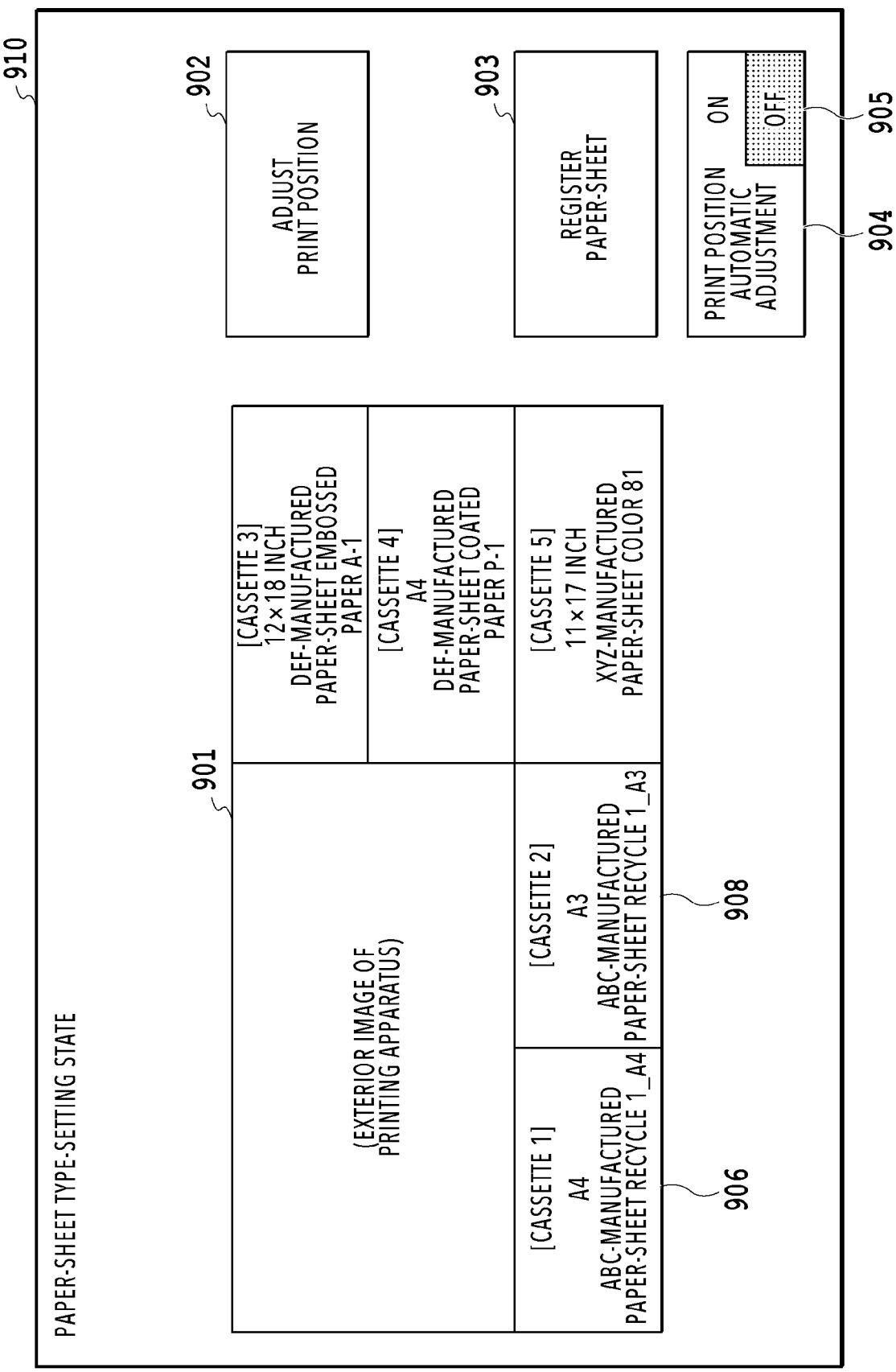
FIG. 9B is a diagram illustrating a modification of the paper-sheet type-setting state screen.

In the case of performing the registration operation of the cassette as described in S1703 and S1704, a paper-sheet type-setting state screen is used. FIG. 9A is a diagram illustrating a situation before the print position deviation amount is inputted in the paper-sheet type-setting state screen. FIG. 9B is a diagram illustrating a situation after the print position deviation amount is inputted in the paper-sheet type-setting state screen. A screen 900 includes cassette information 901, an adjust print position button 902, a register paper-sheet button 903, an automatic adjustment ON button 904, and an automatic adjustment OFF button 905. Descriptions of the adjust print position button 902, the automatic adjustment ON button 904, and the automatic adjustment OFF button 905 are omitted since these are not the gist of the present embodiment.

The cassette information 901 is a region in which information of the type and the size of paper-sheet registered to the cassettes is displayed. The cassette information 901 includes an information region for each of the cassette 1 (140-1) to the cassette 5 (140-5). An information region 906 is an information region for the cassette 1 (140-1), and an information region 908 is an information region for the cassette 2 (140-2). The paper-sheet size detected by a paper-sheet size detection sensor included in each cassette is registered to the corresponding information region. A paper-sheet size change menu 907 may be called to specify the paper-sheet size manually. In any case, a cassette is recognized as a valid cassette only if the paper-sheet in the cassette can be managed by using the paper-sheet attribute data and the paper-sheet size.

The register paper-sheet button 903 is a button used to register the paper-sheet type to the selected cassette. Once the register paper-sheet button 903 is pressed after an information region of the desired cassette is selected from the cassette information 901, the paper-sheet library editing screen 400 is displayed. Then, once the select button 423 is pressed, the paper-sheet selected in FIG. 4 is registered to the information region of the cassette selected in FIG. 9A.

In FIG. 9A, "ABC-manufactured paper-sheet recycle 1", "ABC-manufactured paper-sheet recycle 1", "DEF-manufactured paper-sheet embossed paper A-1", "DEF-manufactured paper-sheet coated paper P-1", and "XYZ-manufactured paper-sheet color 81" are respectively registered to the cassette 1 (140-1) to the cassette 5 (140-5) in this order. Additionally, the paper-sheets in the sizes of "A4", "A3", "12×18 inch", "A4", and "11×17 inch" are respectively set in the cassette 1 to the cassette 5 in this order. That is, as indicated in S1704, the paper-sheet profile "ABC-manufactured paper-sheet recycle 1" with the size unspecified is registered to the cassettes (cassette 1 and cassette 2) in which the paper-sheets in the different sizes are set.

<Input of Print Position Deviation Amount>

In the case of inputting the print position deviation amount manually as indicated in S1705, a paper-sheet attribute editing screen 500 is used. FIG. 5 is a schematic diagram illustrating an interface screen used by the operator to edit the paper-sheet attribute. The screen 500 represents the overall interface screen that the CPU 114 displays on the console panel 120. The screen 500 is displayed if the edit button 421 is selected after a desired paper-sheet is selected in the screen 400.

Entry fields 501 to 504 are text boxes used to input the paper-sheet attributes including the paper-sheet name, the sub scanning direction paper-sheet length, the main scanning direction paper-sheet length, and the basis weight, respectively. Although it is possible to input arbitrary values to the entry fields 502 and 503, a specific combination of values inputted is recognized as a standard size. For example, the combination of 297 mm×210 mm is recognized as A4-size, and the combination of 420 mm×297 mm is recognized as A3-size. A combination of values inputted to the entry fields 502 and 503 other than the specific combination is recognized as a custom size.

The input to the text boxes is performed through a not-illustrated software keyboard and a numeric keypad provided in the console panel 120. An entry field 505 is a combo box used to specify the surface property of the paper-sheet. In the entry field 505, it is possible to specify one of the surface properties supportable by the printing apparatus 100 that are registered in advance to the list. An entry field 506 is a combo box used to specify the color of the paper-sheet. In the entry field 506, it is possible to specify one of the colors that are registered in advance to the list. The operator uses the entry field 506 to select one color closest to the color of the paper-sheet. An entry field 507 is a check box used to specify whether the paper-sheet is preprinted paper. If the paper-sheet is preprinted paper, the operator check-marks the entry field 507.

An entry field group 509 is multiple text boxes used to input various parameters related to the print position deviation amount.

A notification 510 is a message that prompts the input of the paper-sheet length (the input to the entry fields 502 and 503) during the registration of the print position deviation amount. The notification 510 is displayed if, for example, values other than initial values are inputted to the entry field group 509 and also the entry fields 502 and 503 are empty. This is merely one mode of the configuration, and the notification 510 may be displayed constantly.

Once an end editing button 520 is pressed, the paper-sheet attribute inputted until the moment is confirmed and stored in the paper-sheet library. In the present embodiment, if the paper-sheet length is edited in conjunction with the input of the print position deviation amount, the paper-sheet attribute is defined for the paper-sheet profile copied from the original paper-sheet profile and is stored in the paper-sheet library.

If the end editing button 520 is pressed while values other than initial values are inputted to the entry field group 509 and also the entry fields 502 and 503 are empty, the notification 510 may be emphasized and displayed again on the screen 500. Otherwise, in the case where values other than initial values are inputted to the entry field group 509 and also the entry fields 502 and 503 are empty, the end editing button 520 may be grayed out to be prevented from being pressed.

Once the end editing button 520 is pressed and the paper-sheet attribute is defined, the screen 500 is closed, and the paper-sheet library editing screen 400 is displayed again.

A cancel button 521 is a button used to cancel the edit processing of the paper-sheet attribute. Once the cancel button 521 is pressed, the screen 500 is closed without editing the paper-sheet library, and the paper-sheet library editing screen 400 is displayed again.

The print position deviation amount herein indicates a position deviation amount from an ideal print position, and the print position deviation amount in the present embodiment includes items of a right-angle correction amount, a trapezoidal correction amount, a skew correction amount, a lead position, a side position, a main scanning magnification, and a sub scanning magnification.

In the actual printing, based on those print position deviation amounts and the secondary transferring voltage adjustment amount, the printing apparatus 100 makes adjustment to cancel out the print position deviation amounts so as to achieve the printing at the print position with an ideal density. The right-angle correction amount indicates a deviation amount at the right angle of the printing directions in the sub scanning direction and the main scanning direction on the paper-sheet. For example, the right-angle correction amount is indicated by calculating an ideal normal with respect to a straight line printed in the sub scanning direction and using a deviation amount between the ideal normal and the straight line printed in the main scanning direction. The trapezoidal correction amount indicates a deviation amount in the expansion and contraction of the paper-sheet. For example, the trapezoidal correction amount is indicated by using a deviation amount between a straight line printed in the sub scanning direction from a printing start position to a sub scanning trailing end on the paper-sheet and a straight line printed in the sub scanning direction from a position of a main scanning trailing end to the sub scanning trailing end on the paper-sheet. The lead position and the side position indicate the print position deviation amounts in the sub scanning direction and the main scanning direction with respect to the paper-sheet, respectively. The lead position is adjusted by changing a printing start position of an image at a leading paper-sheet end in the paper-sheet conveyance direction. The side position is adjusted by changing a printing start position of an image started from a left paper-sheet end in the paper-sheet conveyance direction. Specifically, the lead position and the side position are implemented by adjusting an emission start timing of the laser beam emitted from the image exposure device 223 to the photosensitive drum 153. The sub scanning direction magnification indicates a deviation of an image length in the sub scanning direction (magnification with respect to an ideal length). Specifically, the sub scanning direction magnification is adjusted by controlling a driving speed of the transferring belt 154. The main scanning direction magnification indicates a deviation of an image length in the main scanning direction (magnification with respect to an ideal length). Specifically, the main scanning direction magnification is adjusted by controlling a clock frequency of the laser beam during the digital image signal is modulated to the laser beam in the image exposure device 223.

<Control Flow>

Figure 18:
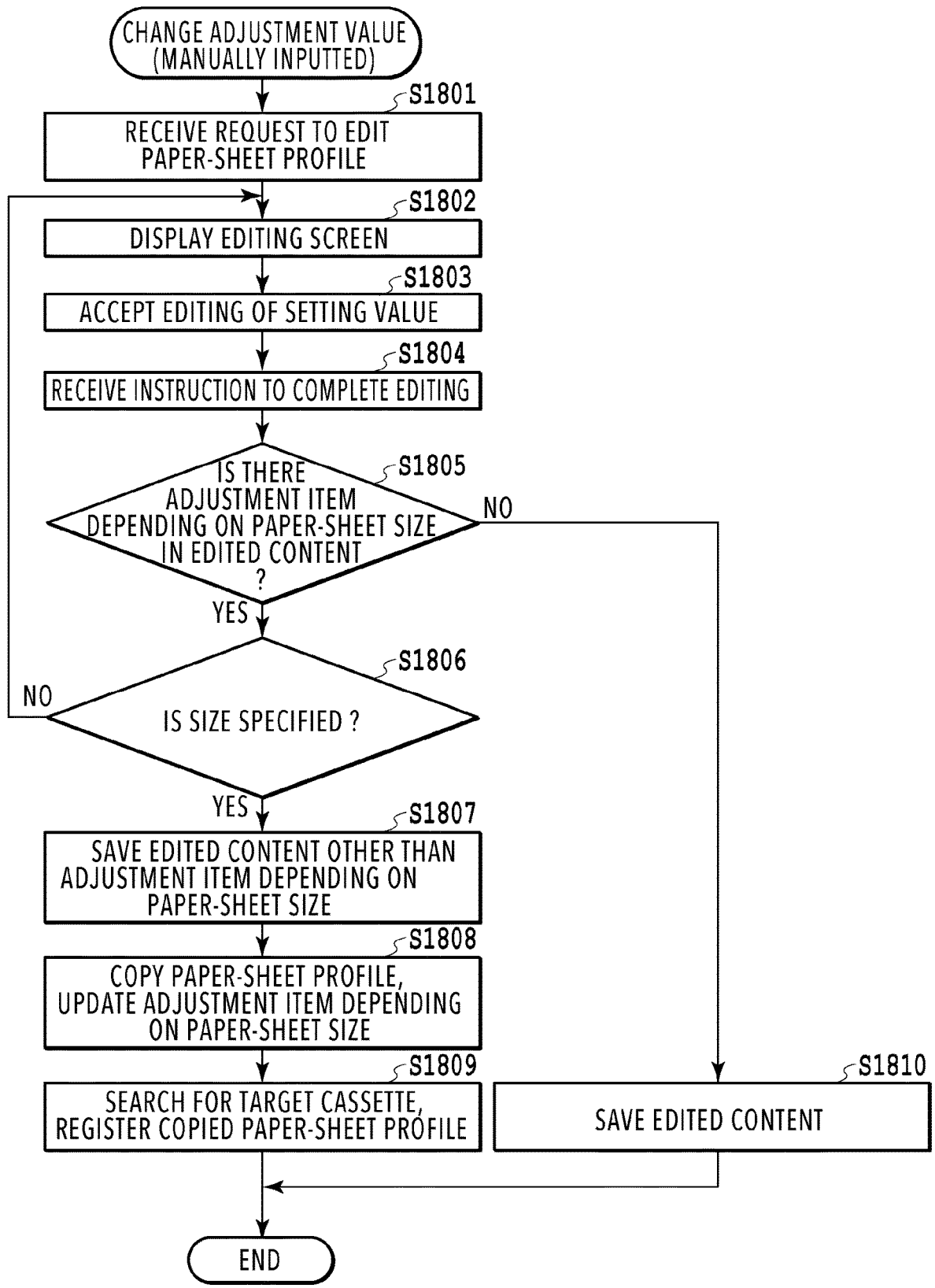
FIG. 18 is a flowchart of a processing of accepting a change in the adjustment value.

The display control flow of the screen 500 is described. FIG. 18 is a flowchart of a processing of accepting a change in the adjustment value. The control described in this flowchart is executed by the controller board 110. To be specific, the above control is implemented with the CPU 114 executing the programs stored in the ROM 112 by extracting the programs to the RAM 113.

In S1801, the controller board 110 detects that the edit button 421 is selected.

In S1802, the controller board 110 causes the display unit of the console panel 120 to display the paper-sheet attribute editing screen 500.

In S1803, the controller board 110 receives the instruction of editing the paper-sheet attribute such as the input to the entry fields 501 to 509.

In S1804, the controller board 110 detects that the end editing button 520 is pressed.

In S1805, the controller board 110 determines whether there is a change in the adjustment item depending on the paper-sheet size (for example, the print position deviation amount). The, if it is YES, the process proceeds to S1806, and if it is NO, the process proceeds to S1810. In S1810, the controller board 110 saves the edited contents, and the processing ends.

In S1806, whether the paper-sheet length information (the sub scanning direction paper-sheet length and the main scanning direction paper-sheet length) is inputted as the paper-sheet attribute is determined. If it is YES, the process proceeds to S1807, and if it is NO, the process returns to S1802.

In S1807, if an item other than the adjustment item depending on the paper-sheet size is edited (for example, editing in the entry field 508 as the secondary transferring voltage adjustment field), the controller board 110 once saves the edited contents in the paper-sheet library.

In S1808, the controller board 110 copies the paper-sheet profile as the editing target (for example, "ABC-manufactured paper-sheet recycle 1"). The copied paper-sheet can be identified by adding "_paper-sheet size" to the original paper-sheet name during the copying of the paper-sheet profile. For example, if "ABC-manufactured paper-sheet recycle 1" is copied with the paper-sheet length of 210×297 being inputted, a paper-sheet profile named "ABC-manufactured paper-sheet recycle 1_A4" is created. Then, the change in the adjustment item depending on the paper-sheet size (for example, the print position deviation amount) is applied to the created paper-sheet profile, and the paper-sheet profile is stored in the paper-sheet library. A screen for confirming the user whether to register the paper-sheet name may be displayed before the paper-sheet name is registered.

In S1809, the controller board 110 searches for the cassette to which the created paper-sheet profile is registered. The target cassette is a cassette to which the original paper-sheet profile of the copied one is registered and in which the size information matches. In this case, since "ABC-manufactured paper-sheet recycle 1" of "A4" size is registered to the cassette 1, "ABC-manufactured paper-sheet recycle 1_A4" is registered to the cassette 1. A screen for confirming the user whether to register the cassette may be displayed before the cassette is registered.

The contents of the paper-sheet library transition from the top table to the lower table in FIGS. 6A to 6C by applying the above-described control to S1706, S1707, S1710, and S1711, for example. That is, the paper-sheet profile "ABC-manufactured paper-sheet recycle 1_A4" in the row 606 and the paper-sheet profile "ABC-manufactured paper-sheet recycle 1_A3" in the row 608 created based on the paper-sheet profile "ABC-manufactured paper-sheet recycle 1" in the row 601 are added. Additionally, as illustrated in FIG. 9B, the paper-sheet type-setting state screen is changed from the screen 900 to a screen 910. In the screen 910, it is possible to see that the paper-sheet profile set in the information region 906 is changed to "ABC-manufactured paper-sheet recycle 1_A4", and the paper-sheet profile set in the information region 908 is changed to "ABC-manufactured paper-sheet recycle 1_A3".

<Remarks>

As described above, in the present embodiment, it is impossible to complete the editing without inputting the paper-sheet size in the case where the adjustment item depending on the size is inputted to the paper-sheet profile with the size unspecified. With this, in the present embodiment, it is possible to prevent the registration of an improper paper-sheet profile having the adjustment item depending on the paper-sheet size although the paper-sheet size is unspecified. Consequently, it is possible to inhibit the occurrence of an image defect due to use of such an improper paper-sheet profile.

According to the present embodiment, it is possible to prompt the user to input the paper-sheet size in the case where the adjustment item depending on the size is inputted to the paper-sheet profile with the size unspecified.

In the present embodiment, in the case where the adjustment item depending on the size is inputted to the paper-sheet profile with the size unspecified, the paper-sheet profile is copied, and the inputted items are reflected to the copied paper-sheet profile. Consequently, according to the present embodiment, the paper-sheet profile with the size unspecified remains, and thus the user can use the paper-sheet profile with the size unspecified as needed.

In the present embodiment, the size information is automatically added to the paper-sheet name during the copying of the paper-sheet profile. Consequently, according to the present embodiment, the user can discriminate the similar paper-sheet profile that is created by the copying.

In the present embodiment, the cassette to which the copied paper-sheet profile is registered is searched for automatically in the case of copying the paper-sheet profile. Consequently, according to the present embodiment, it is possible to omit the effort of registering the newly created paper-sheet profile to the cassette by the user.

Embodiment 2

In the image formation system having the configuration described in FIGS. 1 to 3, in Embodiment 2, an event in which the input of the print position deviation amount based on the image measurement to the paper-sheet profile with the paper-sheet size unspecified is instructed occurs. In this event in Embodiment 2, the paper-sheet profile with the paper-sheet size specified is created.

<Utilization Sequence>

Figure 19:
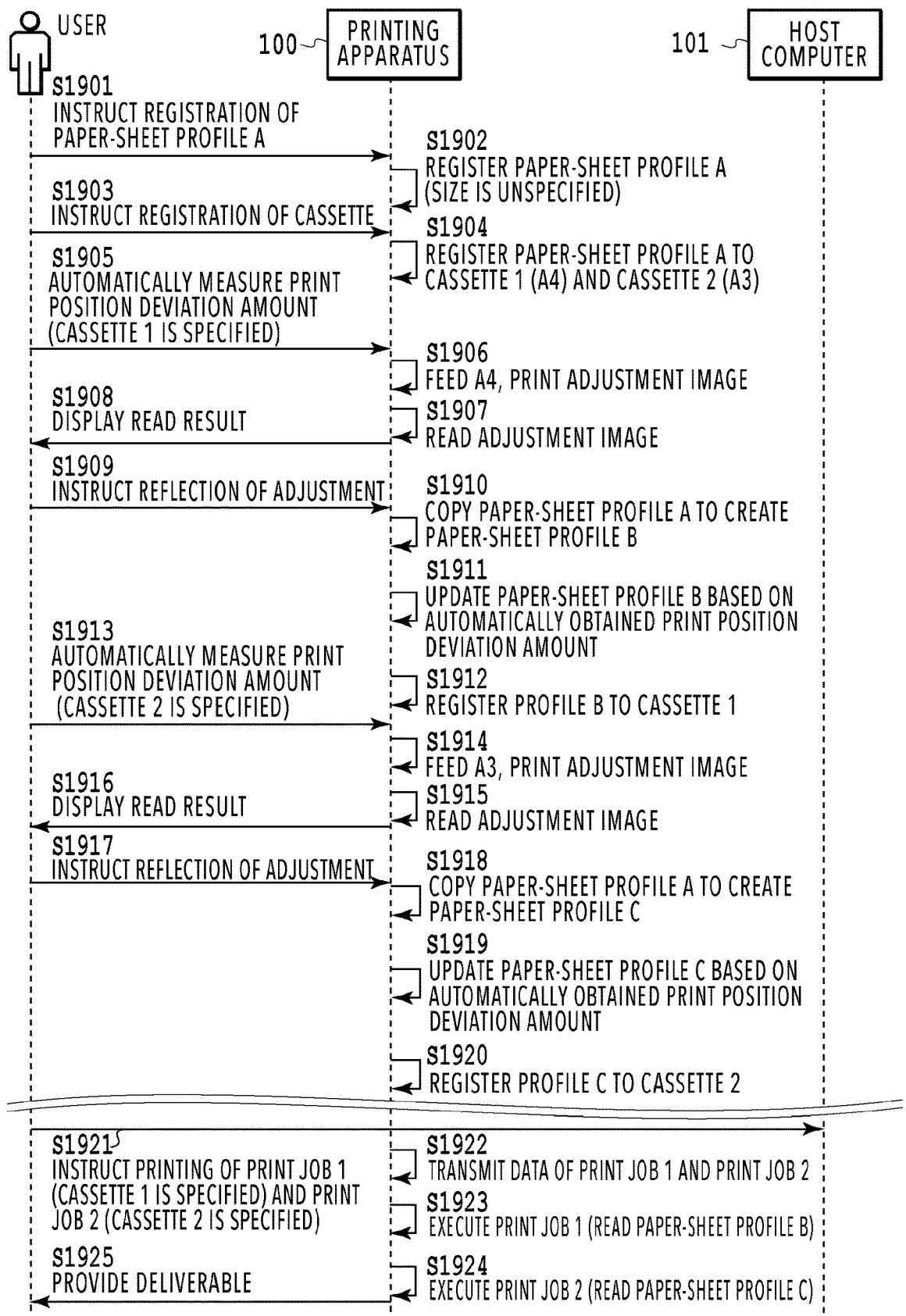
FIG. 19 is a sequence diagram of a case where an input of the adjustment value is received.

First, the overall procedure of the present embodiment is described with reference to FIG. 19. FIG. 19 is a sequence diagram of a case where a print position deviation amount based on the image measurement is inputted to a paper-sheet profile with the size unspecified. In the present embodiment, the processings are performed between mainly a user, the printing apparatus 100, and the host computer 101 as illustrated in FIG. 19.

In S1901 to S1904, the paper-sheet profile and the cassettes are registered. The processings are similar to that of S1701 to S1704; thus, detailed descriptions thereof are omitted.

In S1905, the user instructs the automatic measurement of the print position deviation amount for the cassette 1. In this process, specifying of a cassette is indispensable. In this case, the cassette 1 to which the paper-sheet profile A (for example, "ABC-manufactured paper-sheet recycle 1") of A4-size is registered is specified.

In S1906, the printing apparatus 100 feeds a paper-sheet of A4-size from the specified cassette and prints the adjustment image.

In S1907, the printing apparatus 100 performs a processing of reading the printed adjustment image. The printed adjustment image is conveyed to and read at the reading device 160, or is discharged from the printing apparatus 100 and then set in the scanner 130 by the user to be read by the scanner 130.

In S1908, the printing apparatus 100 displays the read result of the adjustment image on the console panel 120. In this case, the image of the adjustment image read as the read result may be displayed, or parameters obtained based on the read result may be displayed.

In S1909, after confirming the read result, the user instructs the reflection of the obtained adjustment value. The processes of S1908 and S1909 may be omitted. That is, the processing may proceed so as to automatically reflect the obtained print position deviation amount right after the reading of the adjustment image.

In S1910, the printing apparatus 100 copies the paper-sheet profile A (for example, "ABC-manufactured paper-sheet recycle 1") to create the paper-sheet profile B (for example, "ABC-manufactured paper-sheet recycle 1_A4").

In S1911, the printing apparatus 100 applies the obtained print position deviation amount to the paper-sheet profile B to update the information.

In S1912, the printing apparatus 100 registers the paper-sheet profile B to the cassette 1, which is the cassette used to print the adjustment image.

In S1913, the user instructs the automatic measurement of the print position deviation amount for the cassette 2. In this process, specifying of a cassette is indispensable. In this case, the cassette 2 to which the paper-sheet profile A of A3-size is registered is specified.

In S1914, the printing apparatus 100 feeds the paper-sheet of A3-size from the specified cassette and prints the adjustment image.

In S1915, the printing apparatus 100 performs a processing of reading the printed adjustment image. The printed adjustment image is conveyed to and read at the reading device 160, or is discharged from the printing apparatus 100 and then set in the scanner 130 by the user to be read by the scanner 130.

In S1916, the printing apparatus 100 displays the read result of the adjustment image on the console panel 120. In this case, the image of the adjustment image read as the read result may be displayed, or parameters obtained based on the read result may be displayed.

In S1917, after confirming the read result, the user instructs the reflection of the obtained adjustment value. The processes of S1916 and S1917 may be omitted. That is, the processing may proceed so as to automatically reflect the obtained print position deviation amount right after the reading of the adjustment image.

In S1918, the printing apparatus 100 copies the paper-sheet profile A (for example, "ABC-manufactured paper-sheet recycle 1") to create the paper-sheet profile C (for example, "ABC-manufactured paper-sheet recycle 1_A3").

In S1919, the printing apparatus 100 applies the obtained print position deviation amount to the paper-sheet profile C to update the information.

In S1920, the printing apparatus 100 registers the paper-sheet profile C to the cassette 2, which is the cassette used to print the adjustment image.

In the present embodiment, the paper-sheet profile and the cassette are registered as described above. Then, the image formation processings described in S1921 to S1925 are performed by using the registered information. The processings are similar to the processings of S1713 to S1717; thus, detailed description thereof is omitted.

<Print Position Adjustment Screen>

The processings described in S1905, S1908, S1909, S1913, S1916, and S1917 are performed by using a print position adjustment screen. FIG. 10 is a diagram illustrating the print position adjustment screen.

A print position adjustment screen 1000 is a screen displayed on the console panel 120. The print position adjustment screen 1000 is displayed by pressing the adjust print position button 902 on the screen 900. The print position adjustment screen 1000 includes a cassette selection box 1001, a read result region 1002, a print and measure button 1005, a print button 1006, a measure button 1007, an apply button 1003, and a cancel button 1004.

The cassette selection box 1001 is a combo box used to specify a cassette to be used to print the adjustment image. In the combo box, the five cassettes from the cassette 1 to the cassette 5 illustrated in FIGS. 9A and 9B can be selected, and the types of the paper-sheets registered to the cassettes are also displayed.

The read result region 1002 is a region in which various parameters of the paper-sheet obtained as a result of reading the adjustment image are displayed.

The print and measure button 1005 is a button used to instruct the printing of the adjustment image and the reading of the adjustment image at one time. Once the print and measure button 1005 is selected, the paper-sheet is conveyed from the cassette specified through the cassette selection box 1001, and the adjustment image is formed on the paper-sheet by the image formation unit 151 and read by the reading device 160.

The print button 1006 is a button used to instruct the printing of the adjustment image. Once the print and measure button 1005 is selected, the paper-sheet is conveyed from the cassette specified from the cassette selection box 1001, and the adjustment image is formed on the paper-sheet by the image formation unit 151 and discharged to the outside of the apparatus.

The measure button 1007 is a button used to instruct the reading of the adjustment image. Once the measure button 1007 is selected, the adjustment image set in the scanner 130 is read, and the read result is displayed as the information of the cassette specified from the cassette selection box 1001.

The apply button 1003 is a button used to instruct the updating of the print position deviation amount. Once the apply button 1003 is selected, the print position deviation information corresponding to the read result region 1002 is registered as the information of the cassette specified from the cassette selection box 1001. Then, the screen transitions to the screen 900.

The cancel button 1004 is a button used to cancel the print position adjustment processing. Once the cancel button 1004 is selected, the screen transitions to the screen 900 without updating the paper-sheet profile.

<Adjustment Image>

Figure 7:
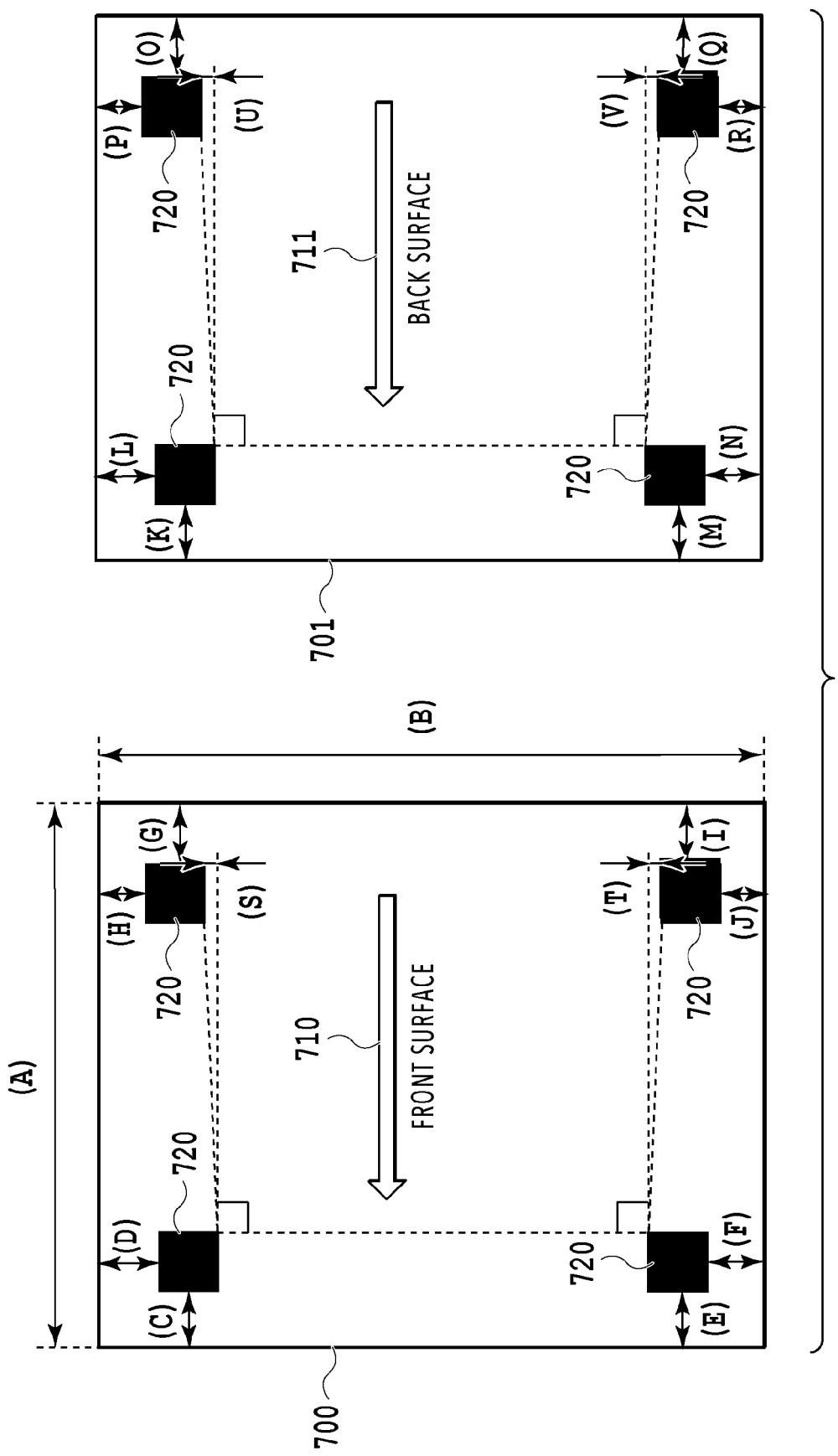
FIG. 7 is a schematic diagram illustrating an adjustment image used for print position adjustment.

The adjustment image used for the image measurement is described. FIG. 7 is a schematic diagram illustrating the adjustment image used for the print position adjustment.

An image surface 700 represents a front side of the adjustment image (a predetermined image, a test image, a mark, a pattern, or a chart). An image surface 701 represents a back side of the adjustment image including the image surface 700. A sign 710 and a sign 711 are images that are printed on the adjustment image to allow the operator to identify the conveyance direction of the adjustment image and the front side and the back side thereof.

In FIG. 7, the paper-sheet conveyance direction is indicated by an arrow, and whether it is the front surface (front side) or the back surface (back side) is indicated by letters below. However, these images are not essential information and may not be printed. For example, the information is unnecessary if the printed adjustment image is read by the reading device. In the present embodiment, the information is arranged such that the operator can work properly while reading an image by the scanner 130.

Marks 720 represent marks printed on specific positions on the adjustment image. The marks 720 are usually formed with toner of a color that has a great difference of reflectance with respect to the color of the paper-sheet. In the present embodiment, the marks 720 are formed with black toner. The marks 720 are respectively printed on eight portions in total, which are four corners of the front side and the back side of the adjustment image. If the print position is ideal, the marks 720 are each arranged and printed at a position away from a corresponding paper-sheet end at a predetermined distance. A deviation amount of the print position is obtained by measuring relative positions of the marks 720 on the adjustment image. In the present embodiment, the portions indicated by (A) to (V) in FIG. 7 are measured. (A) and (B) are the sub scanning direction length and the main scanning direction length of the adjustment image, respectively, and an ideal length is the paper-sheet length defined in the paper-sheet library. (C) to (V) are distances from the corresponding mark 720 to the closest paper-sheet end.

<Calculation of Print Position Deviation Amount>

Next, a method of calculating the print position deviation amount based on the measured (A) to (V) is described with reference to FIG. 8. FIG. 8 is a schematic diagram indicating the method of calculating the print position deviation amount based on the actual measured value of (A) to (V). Items 801 to 812 each indicate a print position deviation amount. The items 801 to 806 respectively indicate a lead position, a side position, a main scanning magnification, a sub scanning magnification, a right-angle correction amount, and a trapezoidal correction amount on the front side. The items 807 to 812 respectively represent a lead position, a side position, a main scanning magnification, a sub scanning magnification, a right-angle correction amount, and a trapezoidal correction amount on the back side.

A column 820 indicates a computation expression for calculating a measured value of a corresponding item based on the actual measured values of (A) to (V) illustrated in FIG. 7. The lead position is an average value of the distances from a leading paper-sheet end in the paper-sheet conveyance direction to corresponding correction markers ((C) and (E), and (K) and (M)). The side position is an average value of the distances from a left paper-sheet end in the paper-sheet conveyance direction to corresponding correction markers ((F) and (J), and (N) and (R)). The main scanning magnification is an average value of the distances between the correction markers arranged on the same scanning line in the main scanning direction. The sub scanning magnification is an average value of the distances between the correction markers arranged on the same scanning line in the sub scanning direction. The right-angle correction amount is an average value of the deviation amounts in the sub scanning direction of the correction markers on the reading trailing end side ((S) and (T), and (U) and (V)) with respect to a straight normal connecting the correction markers arranged on the same scanning line in the main scanning direction on the reading leading end side. The trapezoidal correction amount is a difference between distances between the correction markers arranged on the same scanning line in the sub scanning direction.

A column 821 indicates an ideal value of a corresponding item. The marks 720 in this case are each printed at a position away from a corresponding paper-sheet end by 1 cm, ideally. In this case, an ideal value of the lead position and side position is 1 cm. An ideal value of the main scanning magnification is a value obtained by subtracting 2 cm from the paper-sheet length in the main scanning direction of the paper-sheet registered to the paper-sheet library. An ideal value of the sub scanning magnification is a value obtained by subtracting 2 cm from the paper-sheet length in the sub scanning direction of the paper-sheet registered in the paper-sheet library.

A column 822 indicates a computation expression for calculating a final print position deviation amount of each item based on corresponding measured value and ideal value. The print position deviation amounts of the lead position and the side position are each calculated by subtracting the ideal value from the measured value (unit is mm). The print position deviation amounts of the main scanning magnification and the sub scanning magnification are each calculated by dividing a value obtained by subtracting the ideal value from the measured value by the ideal value (unit is %). For the right-angle correction amount and the trapezoidal correction amount, the measured value thereof is directly used as the correction amount. The thus-calculated print position deviation amounts are managed by the paper-sheet library illustrated in FIGS. 6A to 6C.

(A) to (V) may be measured by the operator who uses a ruler for the measuring, or (A) to (V) may be calculated by the image analysis using an image obtained by scanning the adjustment image by the scanner 130. However, in the present embodiment, (A) to (V) are calculated by the image analysis using an image read by the reading device 160 on the paper-sheet conveyance path, which is connected to follow the printer engine 150. In this calculation method using the image scanned by the reading device, first, the adjustment image that has passed through the line sensors 312 is scanned. Then, the paper-sheet ends of the adjustment image and edges of the marks 720 (boundaries between a paper-sheet base and the marks 720) are detected based on a density difference in the scanned image. Then, lengths of (A) to (V) are calculated based on the detected paper-sheet ends and edges of the marks 720.

<Control Flow>

Figure 20:
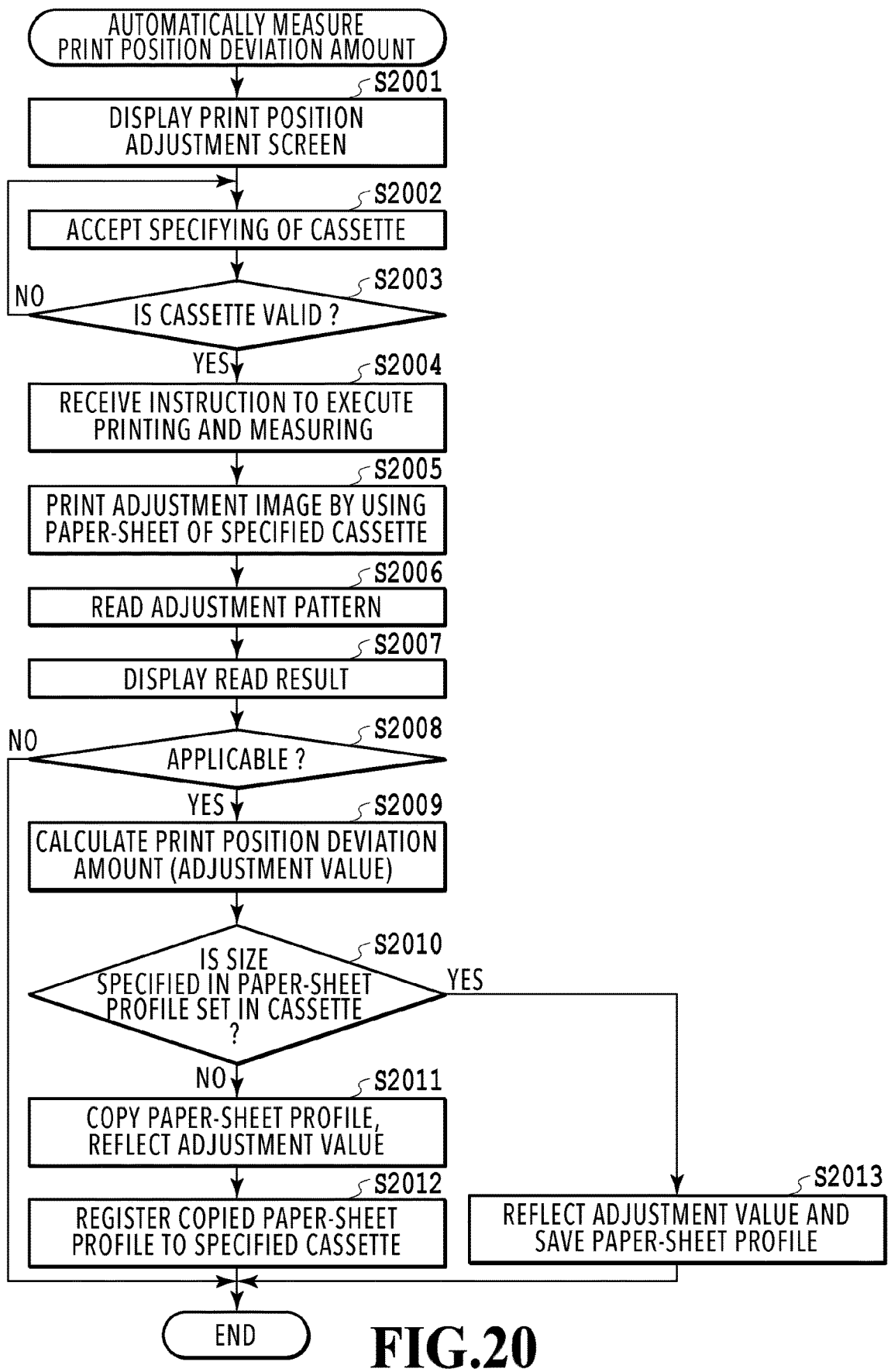
FIG. 20 is a flowchart of cassette setting.

A processing of a case where the print and measure button 1005 is selected in the print position adjustment screen 1000 is described. The description of the processing of a case where the print button 1006 or the measure button 1007 is selected is omitted herein. FIG. 20 is a flowchart of the automatic measurement of the print position deviation amount. The control indicated by the flowchart is executed by the controller board 110. To be specific, the above control is implemented with the CPU 114 executing the programs stored in the ROM 112 by extracting the programs to the RAM 113.

In S2001, the controller board 110 causes the console panel 120 to display the print position adjustment screen 1000 as illustrated in FIG. 10.

In S2002, the controller board 110 receives the instruction of changing the cassette through the selection box 1001 using the console panel 120.

In S2003, the controller board 110 determines whether the cassette that is instructed to be changed is a valid cassette, and if the cassette is invalid (NO), the selection box 1001 is put back to the state before the changing instruction, and if the cassette is valid (YES), the process proceeds to S2004. In this case, a valid cassette is a cassette to which the paper-sheet profile is registered and also the paper-sheet size is registered.

In S2004, the controller board 110 receives the executing instruction through the print and measure button 1005 using the console panel 120.

In S2005, the controller board 110 conveys the paper-sheet from the cassette specified through the selection box 1001 and causes the image formation unit 151 to form the adjustment image.

In S2006, the controller board 110 obtains a read image of the adjustment image printed on the paper-sheet from the reading device 160.

In S2007, the controller board 110 updates the print position adjustment screen 1000 to a state where the fields of the read result regions are filled with the measured results. The fields of the read result region 1002 may be configured to be changed from this state by the user changing the values manually.

In S2008, the controller board 110 determines whether an input through the console panel 120 is by selecting the apply button 1003 or by selecting the cancel button 1004. If the cancel button 1004 is selected (NO), the control flow ends. If the apply button 1003 is selected (YES), the process proceeds to S2009.

In S2009, the controller board 110 calculates the print position deviation amount (adjustment value) by using the obtained read result. The print position deviation amount is calculated as described in FIG. 8.

In S2010, the controller board 110 determines whether the paper-sheet size information is registered to the paper-sheet profile associated with the cassette selected from the selection box 1001. If it is YES, the process proceeds to S2013. If it is NO, the process proceeds to S2011. In S2013, the controller board 110 updates the paper-sheet profile based on the adjustment value obtained from the calculation, saves the paper-sheet profile, and terminates the control flow.

In S2011, the controller board 110 copies the paper-sheet profile that is associated with the cassette selected from the selection box 1001. Then, the copied paper-sheet profile is updated based on the adjustment value obtained by the calculation. In this process, the paper-sheet length information is inputted to the paper-sheet profile that is copied based on the paper-sheet size information registered to the cassette.

In S2012, the controller board 110 associates the copied paper-sheet profile with the cassette selected from the selection box 1001 and then terminates the control flow.

<Remarks>

As described above, in the present embodiment, the adjustment image is printed by using the cassette associated with the paper-sheet profile with the size unspecified. Then, once the adjustment value is obtained from the result of reading the adjustment image, the paper-sheet profile associated with the cassette is copied, and the inputted values are reflected to the copied paper-sheet profile. With this, since the paper-sheet profile with the size unspecified remains, the user can use the paper-sheet profile with the size unspecified as necessary.

In the present embodiment, a cassette associated with the paper-sheet profile and also to which the paper-sheet size is registered is treated as the valid cassette. Thus, it is possible to inhibit wasteful printing of the adjustment image in a case where the print position deviation amount cannot be registered (should not be registered).

Embodiment 3

In the image formation system having the configuration described in FIGS. 1 to 3, in Embodiment 3, an event in which the whole image formation is performed by using the cassette to which the paper-sheet profile with the paper-sheet size unspecified is registered occurs. In Embodiment 3, a case where the paper-sheet profile with the paper-sheet size specified is created during the event is described. Specifically, a case where the paper-sheet size is switched while executing a series of jobs is described.

<Utilization Sequence>

Figure 15:
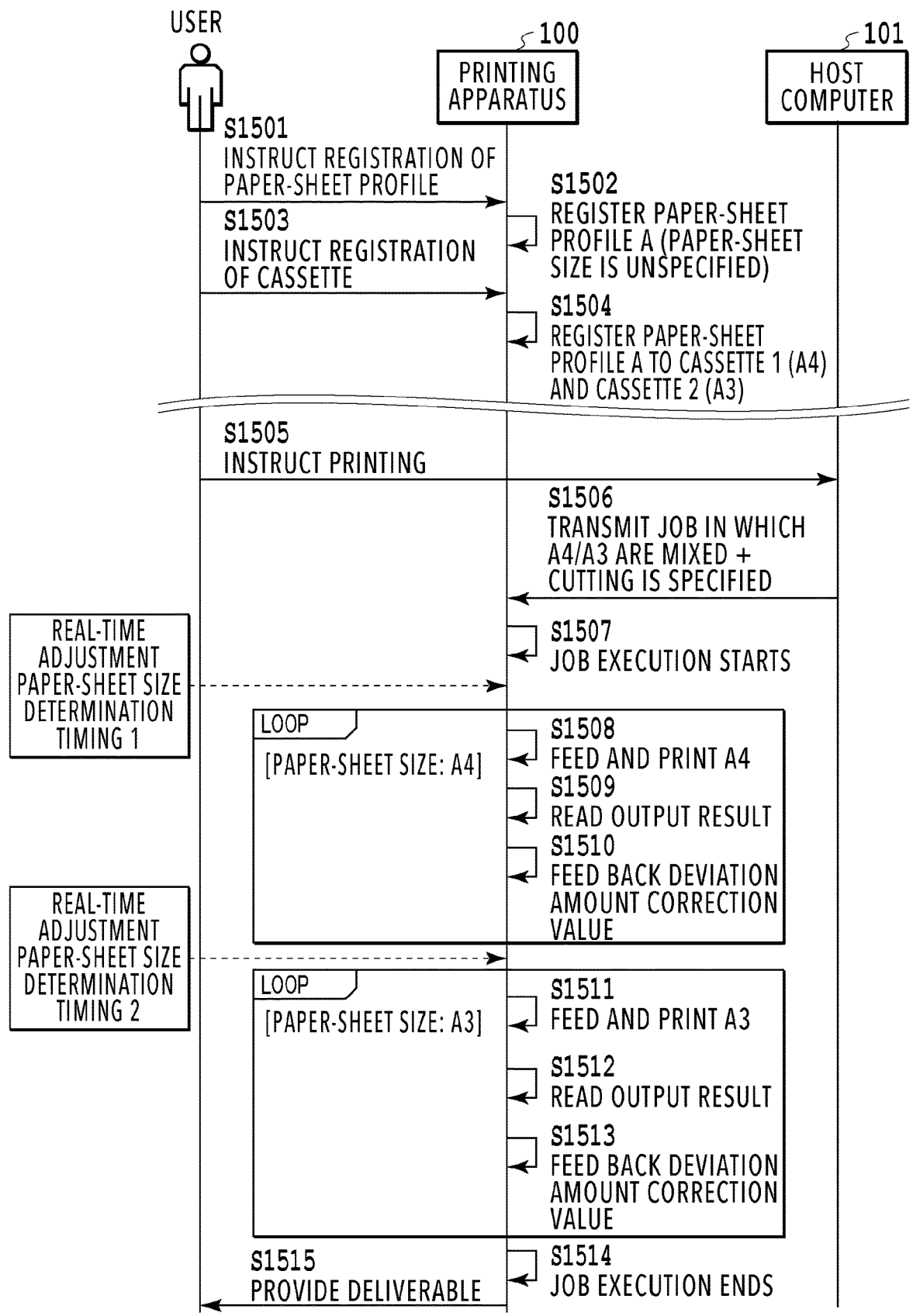
FIG. 15 is a sequence diagram indicating a procedure of the real-time adjustment.

In the present embodiment, the real-time adjustment in which the measuring of the print position deviation amount and the feedback of the result are performed while executing the print job is performed. FIG. 15 is a sequence diagram illustrating a procedure of the real-time adjustment. In FIG. 15, first, in S1501, the user instructs the printing apparatus 100 to register a paper-sheet profile. In this case, the instruction of registering a paper-sheet profile includes the operation flow of setting and registering the attribute information on the paper-sheet type to the paper-sheet library described above with reference to FIGS. 4 and 5. Next, in S1502, the printing apparatus 100 registers the paper-sheet profile (the paper-sheet profile A) instructed in S1501 to the paper-sheet library. At this moment, the paper-sheet profile A does not include information on the paper-sheet size. Next, in S1503, the user instructs the printing apparatus 100 to register a cassette. In this case, the instruction of registering a cassette includes the operation flow of setting and registering the paper-sheet type to each cassette of the printing apparatus 100 as described above with reference to FIGS. 9A and 9B. Next, in S1504, the printing apparatus 100 sets and registers the paper-sheet profile (the paper-sheet profile A) instructed in S1503 to each cassette. In this case, the paper-sheet profile A is set and registered to each of the cassette 1 (paper-sheet size A4) and the cassette 2 (paper-sheet size A3) as a profile of the paper-sheet type.

Next, in S1505, the user operates the host computer 101 to instruct the printing related to a print job. Once receiving the printing instruction, in S1506, the host computer 101 transmits the print job to the printing apparatus 100. In this case, the print job includes not only the image data to be printed but also various kinds of information necessary for the printing such as the cassette or the paper-sheet type (the paper-sheet profile) to be used for the printing, the paper-sheet size, the number of printed sheets, the instruction of printing whether duplex or simplex, and the instruction of the cutting printing. In this case, the print job includes the image data of the paper-sheet size A4/A3 mixed together, and also the cutting is instructed. Accordingly, the printing apparatus 100 reads the print position adjustment marks (the predetermined image) formed in a blank region around the image formed on the output paper-sheet of the print job, and adjusts the deviation amount of the image to be formed on the paper-sheet based on the read result. Once receiving the print job, the printing apparatus 100 starts executing the print job.

First, the printing apparatus 100 starts the printing-out of A4-size and determines to perform the real-time adjustment for the paper-sheet (real-time adjustment paper-sheet size determination timing 1). The printing apparatus 100 performs processings of feeding and printing (S1508), reading of the output result by the reading device 160 (S1509), and feedback of the print position deviation amount adjustment value of only A4-size (S1510) for the printing-out of the paper-sheet. To be specific, the paper-sheet profile with the size unspecified is copied to create the paper-sheet profile for A4-size, and the adjustment value is updated for the paper-sheet profile. Then, the updated adjustment value is reflected to the print in real time.

The processings from S1508 to S1510 are executed repeatedly until the output paper-sheet size is switched.

Next, the printing apparatus 100 starts the printing-out of A3-size and determines to perform the real-time adjustment for the paper-sheet (real-time adjustment paper-sheet size determination timing 2). The printing apparatus 100 performs processings of feeding and printing (S1511), reading of the output result by the reading device 160 (S1512), and feedback of the print position deviation amount adjustment value of only A3-size (S1513) for the printing-out of the paper-sheet. To be specific, the paper-sheet profile with the size unspecified is copied to create the paper-sheet profile for A3-size, and the adjustment value is updated for the paper-sheet profile. Then, the updated adjustment value is reflected to the print in real time.

Once the printing-out of all the pages related to the print job is completed by executing the processings of S1508 to S1513, the printing apparatus 100 terminates the execution of the print job in S1514. Then, in S1515, the user obtains the outputted deliverable of the print job.

<Real-Time Adjustment>

Figure 14:
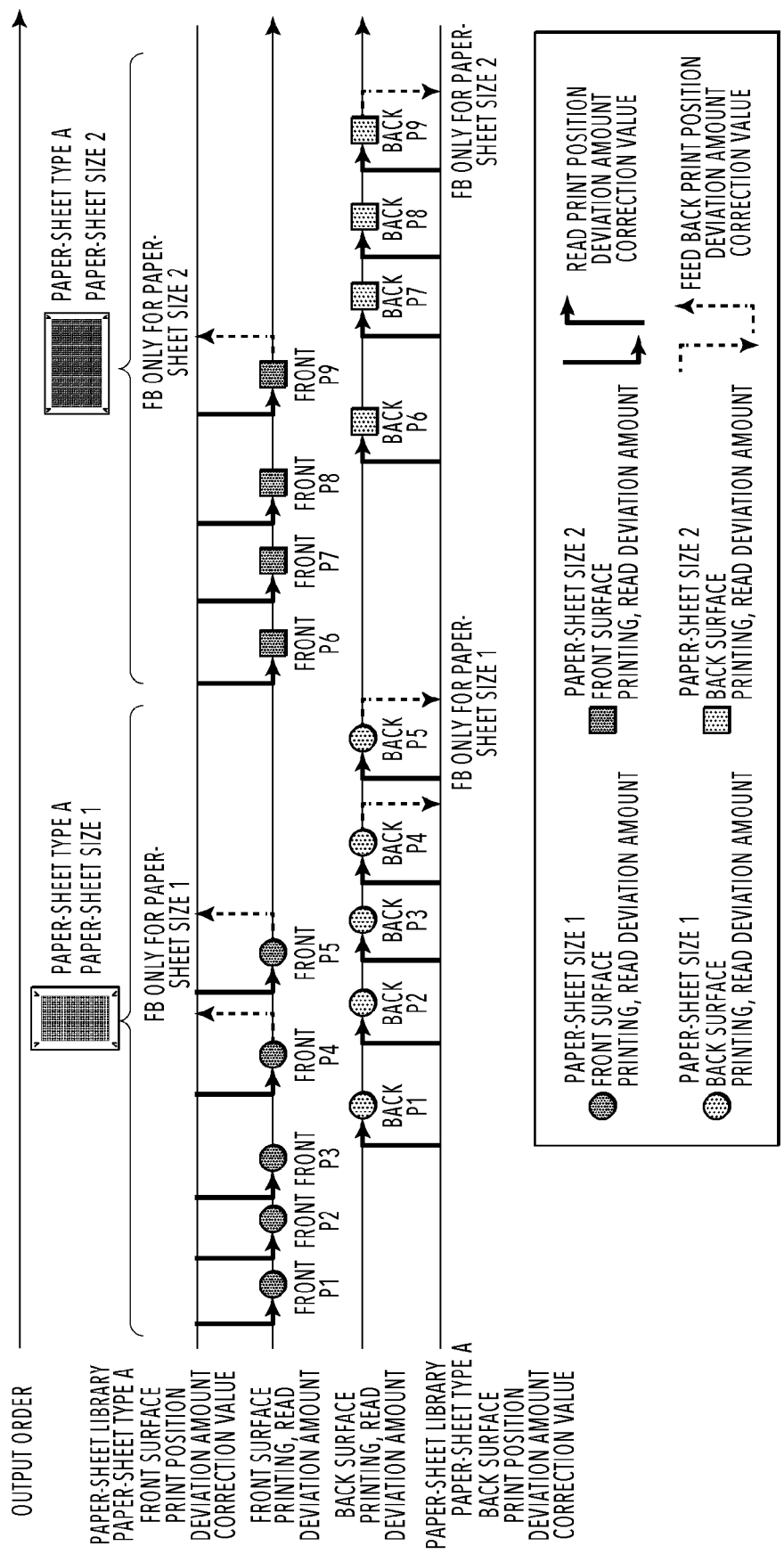
FIG. 14 is a diagram describing a relationship between processings during real-time adjustment.

The relationship between the reading and the feedback during the real-time adjustment is described. FIG. 14 is a schematic diagram illustrating the relationship between the output order of the output paper-sheet in the real-time adjustment, the processing of reading the output image by the reading device 160, and the feedback of the print position deviation amount adjustment value to the paper-sheet library. FIG. 14 illustrates the procedure of performing the real-time adjustment for the print job using paper-sheets of the same paper-sheet type (the paper-sheet type A) but mixed paper-sheet sizes (the paper-sheet size 1 and the paper-sheet size 2). In FIG. 14, the printing apparatus 100 performs the reading of the print position deviation amount adjustment value for both the front side and the back side of the paper-sheet size 1 from the paper-sheet library and the feedback of the print position deviation amount adjustment value of only the paper-sheet size 1 to the paper-sheet library. Next, the printing apparatus 100 performs the reading of the print position deviation amount adjustment value for both the front side and the back side of the paper-sheet size 2 from the paper-sheet library and the feedback of the print position deviation amount adjustment value of only the paper-sheet size 2 to the paper-sheet library.

<Print Application>

The above-described real-time adjustment is executed in a case where the user specifies the use of the feature of the real-time adjustment. In the operation flow described in FIG. 15, the use of the real-time adjustment is specified through an application executed by the host computer in the processings of S1505 and S1506. FIG. 13 is a diagram illustrating an application screen of the host computer. FIG. 13 is an application screen displayed on the console panel 120. FIG. 13 is a job printing application screen 1300. The job printing application screen 1300 includes a print job list 1310 and a job action 1320. The print job list 1310 is a screen to show the print job received from the host computer 101. The print job list 1310 displays the representative setting for the job such as the number of pages, the number of prints, and simplex/duplex setting of each job. The job action 1320 displays actions to the job displayed on the print job list 1310. The job action 1320 includes a print button 1321, an RIP button 1322, a print position adjust button 1323, and a job property button 1324. The print button 1321 is a button used to print a job selected from the print job list 1310 by the printing apparatus 100. The RIP button 1322 is a button used for rendering the job selected from the print job list 1310 by the printing apparatus 100. The print position adjust button 1323 includes a check box and is a button used to select whether perform the adjustment by printing the adjustment image on the paper-sheet blank during the job selected from the print job list 1310. If the print position adjust button 1323 is checked, a flag of print position adjustment is applied with the print button 1321 being pressed, and the printing data is transmitted to the printing apparatus 100. Then, with the printing data to which the print position adjustment flag is applied, the adjustment image (a predetermined image, a test image, a mark, or a pattern) is printed on the blank of the paper-sheet in the printing by the printing apparatus 100, and the real-time adjustment is executed. The job property button 1324 is a button used to display the printing setting of the job selected from the print job list 1310. Once the job property button 1324 is pressed, a job setting list (not illustrated) is displayed. The job setting list includes not only the items of the number of prints and the simplex/duplex setting but also the items of the printing paper-sheet setting for each page.

If no job is selected from the print job list 1310, the print button 1321, the RIP button 1322, the print position adjust button 1323, and the job property button 1324 are grayed out and are unable to be pressed.

<Control Flow>

Figure 12:
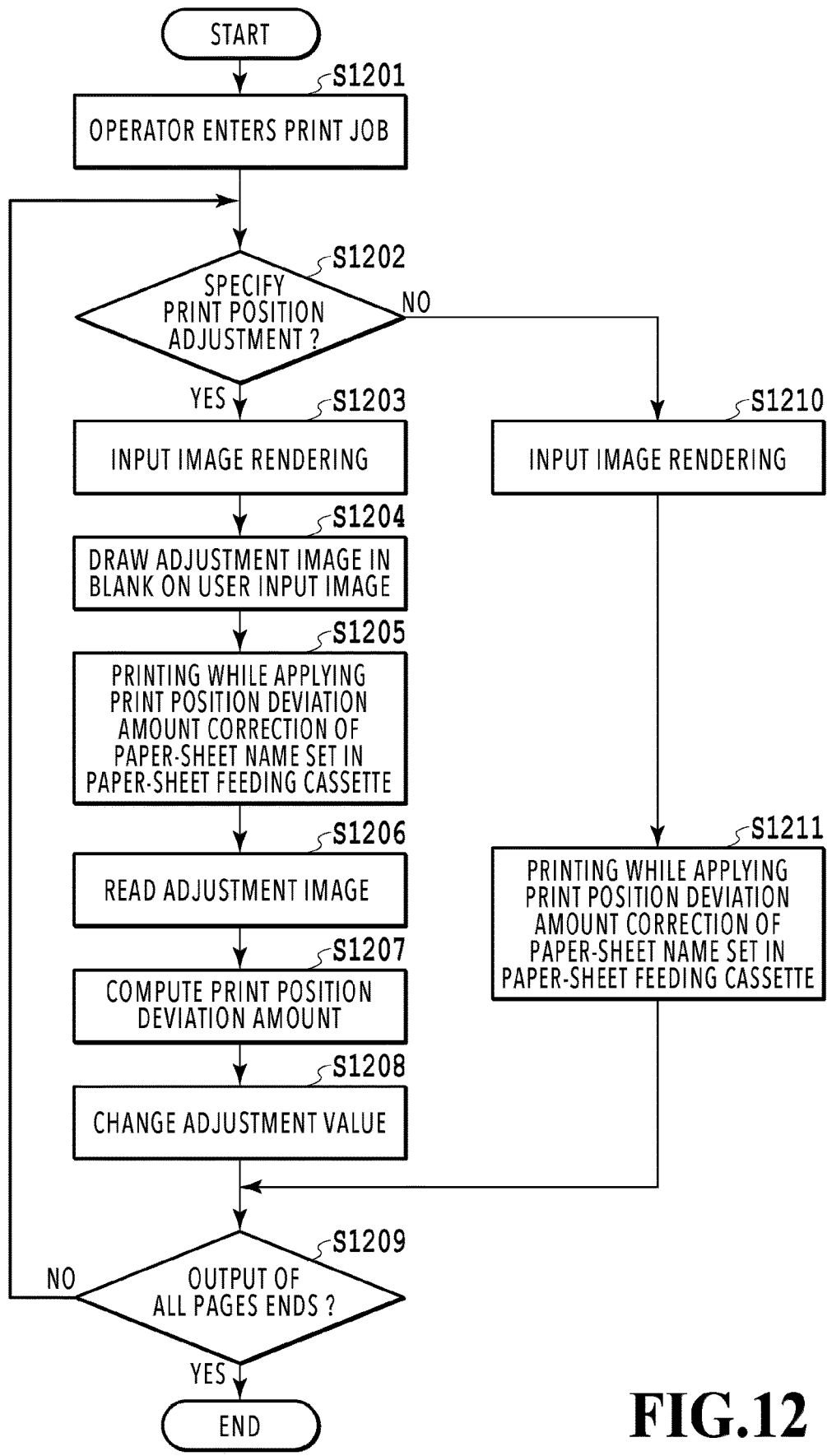
FIG. 12 is a flowchart indicating an adjustment value update processing.

The control flow performed by the printing apparatus 100 while executing the real-time adjustment is described. In the processings of S1507 to S1514 in FIG. 15, the printing apparatus 100 performs a control as described in FIG. 12. FIG. 12 is a flowchart indicating the adjustment value update processing. The control indicated by the flowchart is executed by the controller board 110. To be specific, the above control is implemented with the CPU 114 executing the programs stored in the ROM 112 by extracting the programs to the RAM 113.

In S1201, the controller board 110 receives the printing data transmitted from the host computer 101 in response to the instruction by the operator and receives the printing data as the print job.

In S1202, the controller board 110 determines whether the print position adjustment is specified in the received print job. If it is YES, the process proceeds to S1203, and if it is NO, the process proceeds to S1210.

In S1203, the controller board 110 extracts the image data of the user to the RAM 113 by rendering the printing data (the PDL data).

In S1204, the controller board 110 draws the adjustment image in a blank portion of the image data in the RAM 113.

In S1205, the controller board 110 obtains the image correction value from the paper-sheet profile set in the selected cassette and performs the image correction based on the image correction value on the image data in the RAM 113. Then, the controller board 110 causes the printer engine 150 to perform the printing using the corrected image data.

In S1206, the controller board 110 reads the printed adjustment image by the reading device 160 and obtains the image.

In S1207, the controller board 110 analyzes the obtained image and computes the print position deviation amount by using the method described with reference to FIG. 8.

In S1208, the controller board 110 updates the paper-sheet library by using the computed print position deviation amount. To be specific, the adjustment value is updated for the paper-sheet profile registered to the cassette used to print the adjustment image. In this process, if the paper-sheet size of the registered paper-sheet profile is unspecified, the paper-sheet profile is copied by using the size information registered to the cassette. Then, the processing of updating the adjustment value obtained for the copied paper-sheet profile is performed. The updated print position deviation amount is used as the correction value for the following printing.

In S1209, the controller board 110 terminates the job if output of all the pages of the PDL data inputted by the user is completed. If output of all the pages is not completed yet, the process returns to S1202, and the rendering, the printing, and the adjustment processings are continued. In this way, it is possible to obtain the print position deviation amount for each page and reflect the print position deviation amount to the following printing. In this case, the processing is continued even if the size of the next page is different from the size of the preceding page. For example, it is possible to process a page in A3-size sequentially after processing a page in A4-size. In the case where the page sizes are mixed in the job to be executed as described above, the paper-sheet profile may be copied for each size in S1208.

In S1210, the controller board 110 extracts the image data of the user to the RAM 113 by rendering the printing data (the PDL data).

In S1211, the controller board 110 obtains the image correction value from the paper-sheet profile set in the selected cassette and performs the image correction based on the image correction value on the image data in the RAM 113. Then, the controller board 110 causes the printer engine 150 to perform the printing using the corrected image data.

<Remarks>

As described above, according to the present embodiment, even in the real-time adjustment using the paper-sheet profile with the size unspecified, it is possible to register the adjustment value of the print position deviation amount obtained during the real-time adjustment to the paper-sheet profile.

Additionally, according to the present embodiment, even if mixed sizes of the paper-sheet profiles with the size unspecified are used in the real-time adjustment, it is possible to register the adjustment value of the print position deviation amount obtained during the real-time adjustment to each paper-sheet profile.

(Modification)

Embodiments 1 to 3 assume that the print position deviation amount for only one size can be held by each paper-sheet profile. However, the print position deviation amount for multiple paper-sheet sizes may be held by each paper-sheet profile. FIGS. 16A to 16C are totally a diagram describing a transition of the paper-sheet library. A top table in FIG. 16A to 16 C is similar to the table in FIG. 6A to 6C; thus, the description thereof is omitted.

A row 1601 indicates information on "ABC-manufactured paper-sheet recycle 1" updated from the state of the row 601. As seen from the indications of the print position deviation amount (front surface) in the column 618 and the print position deviation amount (back surface) in the column 619, in this case, information on the print position deviation amounts for multiple sizes is registered for each paper-sheet profile. If the paper-sheet name of the paper-sheet used for the printing is "ABC-manufactured paper-sheet recycle 1" and also the paper-sheet size is "A4", the print position deviation amounts indicated with "[A4]" in the columns 618 and 619 are used. If the paper-sheet name of the paper-sheet used for the printing is "ABC-manufactured paper-sheet recycle 1" and also the paper-sheet size is "A3", the print position deviation amounts indicated with "[A3]" in the columns 618 and 619 are used.

If the paper-sheet name of the paper-sheet used for the printing is "ABC-manufactured paper-sheet recycle 1" and also the paper-sheet size is other than "A3" or "A4", the print position deviation amounts indicated with "[–]" in the columns 618 and 619 are adopted. Then, thereafter, the print position deviation amount for the paper-sheet size other than "A3" or "A4" is added as necessary. If this method is adopted, the paper-sheet profile is not needed to be copied.

In Embodiment 3, the print position automatic adjustment (the real-time adjustment) is performed in the case where the print position adjustment flag is applied to the print job transmitted from the host computer 101. That is, whether the print position automatic adjustment is performed is specified through the application of the host computer 101. However, whether the print position automatic adjustment is performed may be specified by the printing apparatus 100. The screen 900 illustrated in FIG. 9A includes the print position automatic adjustment ON button 904 and the print position automatic adjustment OFF button 905. On the screen 900, if the button 904 is selected after selecting the cassette, a flag is set so as to perform the print position automatic adjustment in the case of performing the printing by using the cassette. If the button 905 is selected after selecting the cassette, a flag is set so as not to perform the print position automatic adjustment in the case of performing the printing by using the cassette. Then, for example, the flag is used to perform the determination in S1202.

Figure 11:
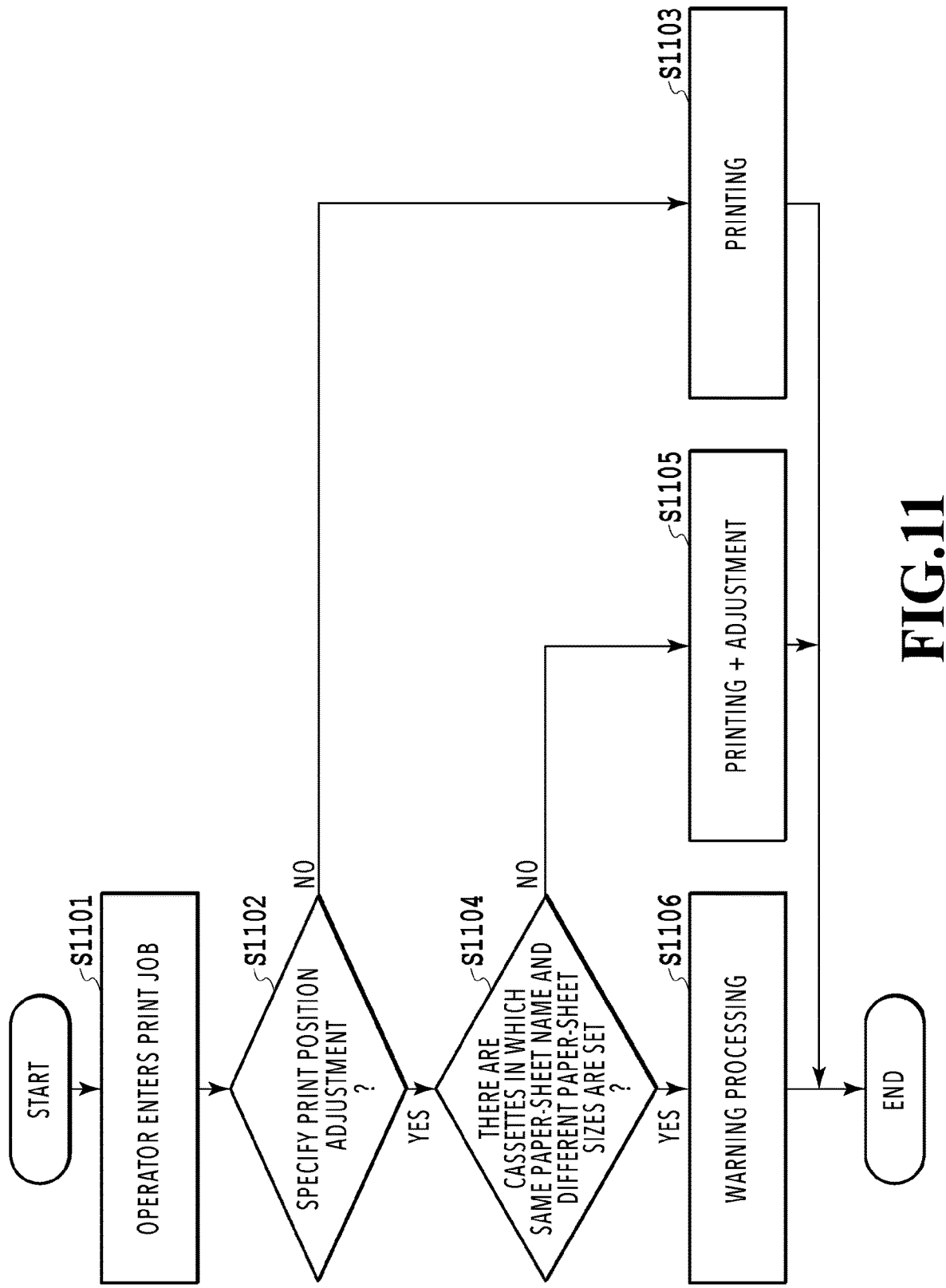
FIG. 11 is a flowchart indicating operations of the printing apparatus.

In Embodiment 3, the case where the print position automatic adjustment can be performed even for the job including mixed sizes is described. However, since the configuration that allows the mixed sizes makes the processing complicated, it is not necessarily to have the configuration that allows the mixed sizes. For example, updating of the print position deviation amount may be performed only for some of the multiple sizes. In this case, whether the paper-sheet size is the same as the paper-sheet size on which the adjustment is already being executed is determined between S1203 and S1204 in FIG. 12, and if it is YES, the process may proceed to S1204, and if it is NO, the process may be skipped to S1209. If the print position deviation amount is updated only for some of the multiple sizes, it is desirable to notify the user of such updating. The processing that does not allow the job including mixed sizes is described with reference to FIG. 11. FIG. 11 is a flowchart indicating a procedure of job receiving processings of the printing apparatus. The control indicated by the flowchart is executed by the controller board 110. To be specific, the above control is implemented with the CPU 114 executing the programs stored in the ROM 112 by extracting the programs to the RAM 113.

In S1101, the controller board 110 receives the print job transmitted from the host computer 101 in response to the instruction by the user.

In S1102, the controller board 110 determines whether the print job is a job in which the print position adjustment is specified. If it is YES, the controller board 110 causes the process to proceed to S1104, and if it is NO, the controller board 110 causes the process to proceed to S1103.

In S1103, the controller board 110 processes the print job as a normal print job.

In S1104, the controller board 110 confirms the paper-sheet profile set in the print job to determine whether it is the paper-sheet profile with the size unspecified. Then, the controller board 110 determines whether there are multiple cassettes to which the paper-sheet profile is registered and also whether different paper-sheet sizes are specified. If the paper-sheet profile used for the print job is the paper-sheet profile with the size unspecified and is also the paper-sheet profile registered to the multiple cassettes in which different sizes are specified (YES), the controller board 110 causes the process to proceed to S1106. If it is not (NO), the controller board 110 causes the process to proceed to S1105.

In S1105, the controller board 110 applies the adjustment image in the paper-sheet blank, prints out the job inputted by the user, and executes the adjustment operation.

In S1106, the controller board 110 displays a warning screen on the console panel 120. This warning screen includes a message telling that the automatic print position adjustment is reflected to only one paper-sheet size. It is possible to specify the continuation of the job and the canceling of the job through this warning screen.

Embodiment 4

In Embodiment 3, the case where the paper-sheet size is switched during the execution of sequential jobs is described. Then, the example where the adjustment value of the print position deviation amount obtained during the real-time adjustment can be registered to the paper-sheet profile even though the paper-sheet profile with the size unspecified can be used in the real-time adjustment is described.

In Embodiment 4, an example where the paper-sheet size is not registered to the paper-sheet profile and also the paper-sheet profile is not copied and created for each paper-sheet size is described. In Embodiment 4, the information of the paper-sheet size used for the adjustment is registered to the paper-sheet profile. In Embodiment 4, an example where the feedback in the real-time adjustment is performed for a predetermined paper-sheet size but the feedback in the real-time adjustment is not performed for the other paper-sheet size if the real-time adjustment is performed using the job including mixed paper-sheet sizes as described in Embodiment 3.

That is, in the present embodiment, an image formation apparatus that is used in an environment for the usage of the apparatus where the paper-sheet size is not managed as the paper-sheet profile but managed as a setting value of the cassette. A specific example that is possible in a case of performing the automatic adjustment in such an environment for the usage of the apparatus is described. For example, the paper-sheet profile of the paper-sheet type A includes an adjustment value A1. The paper-sheet profile of the paper-sheet type A is set for the cassettes 1 and 2 in which different sizes of paper-sheets are stored. In this case, the adjustment value A1 included in the paper-sheet profile of the paper-sheet type A may be fed back due to the automatic adjustment in a case of using either of the cassettes 1 and 2 that feed different sizes of paper-sheets, and there may be a case that the output is performed at an unintended print position. In the embodiment described below, an example of inhibiting the unintended adjustment of the print position in such an environment for the usage of the apparatus is described.

<Print Processing>

Figure 21:
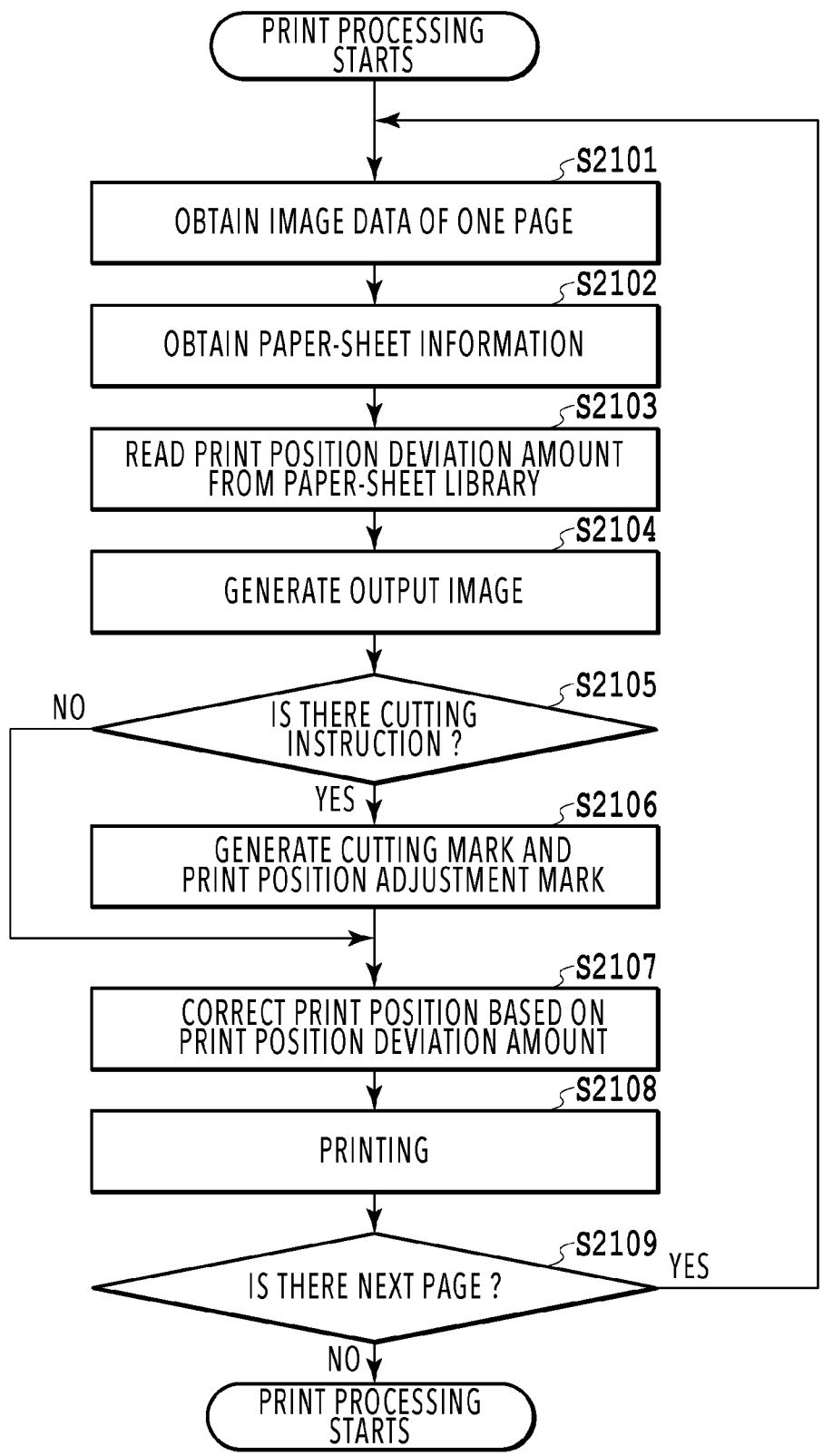
FIG. 21 is a flowchart indicating a print processing.

FIG. 21 is a flowchart describing the print processing of the printing apparatus 100. The steps in the flowchart illustrated in FIG. 21 are implemented with the CPU 114 reading and executing the program stored in the ROM 112. The steps in the flowcharts described below with reference to the other diagrams are similarly executed by the CPU 114 unless stated otherwise. The sign "S" in the description of each processing means the steps in the flowcharts.

The processings in FIG. 21 are executed every time the printing apparatus 100 obtains the print job. Once the print job is inputted from the host computer 101, in S2101, the CPU 114 obtains image data of one page to be printed out. Additionally, the paper-sheet size of the page is determined. Next, in S2102, the CPU 114 obtains from the print job the information on the paper-sheet on which the page is outputted. Next, in S2103, the CPU 114 refers to the paper-sheet library based on the paper-sheet information obtained in S2102, determines the paper-sheet profile corresponding to the paper-sheet information, and obtains the various paper-sheet attributes and print position deviation amounts included in the paper-sheet profile. Next, in S2104, the CPU 114 generates a bitmap image by executing the RIP processing considering the adjustment (the correction) for the print position deviation amount for the image data of the page.

Next, in S2105, the CPU 114 confirms whether the cutting is instructed for the job. If the cutting is instructed, the process proceeds to S2106, and if not, the process proceeds to S2107. In the present embodiment, it is possible to inhibit generation of a waste paper-sheet by printing the print position adjustment marks 720 in the blank portion of the paper-sheet to be trimmed during the cutting. For this reason, in S2105, the CPU 114 confirms whether the cutting is instructed.

In S2106, the CPU 114 generates cutting marks and the print position adjustment marks to be formed on the output paper-sheet with the output image and synthesizes the marks with the bitmap image generated in S2104. In S2107, the CPU 114 determines the various image formation adjustment values corresponding to the print position deviation amounts and notifies the printer engine 150 of the determined values. That is, the print position is adjusted according to the print position deviation amounts. Next, in S2108, the CPU 114 controls the printer engine 150 to feed the specified paper-sheet from the paper-sheet feeding device 140 and forms and prints the output image based on the bitmap image on the fed paper-sheet. Next, in S2109, the CPU 114 confirms whether the job includes the next page image to be printed and outputted. In S2109, if it is determined that there is the next page, the CPU 114 returns to S2101 and continues the processing, and if it is not, the CPU 114 terminates the sequential print processings. In this way, in the present embodiment, if the cutting instruction is included in the print job, the processing of forming the print position adjustment marks on the output paper-sheet is performed.

In the present embodiment, even if the adjustment value for the print position adjustment is included in the paper-sheet profile of the paper-sheet library in FIG. 6A to 6C, there may be a case where the print position is adjusted by using the adjustment value and a case where the adjustment value is not used. In the present embodiment, the environment for the usage of the apparatus is the environment where the paper-sheet size is not managed by the paper-sheet library, and there may be a case that the position adjustment is not properly performed if the print position is adjusted by using the adjustment value obtained based on a different size of paper-sheet.

Thus, if the paper-sheet of the paper-sheet size not used for calculating the adjustment value is used for the printing, the adjustment according to the print position deviation amount performed in S2104 and S2107 described above is not performed. Otherwise, adjustment using an initial value is performed. That is, if the image data obtained in S2101 is data to be printed by using the paper-sheet of the paper-sheet size not used for calculating the adjustment value, the adjustment value included in the paper-sheet profile is not used. In the present embodiment, each paper-sheet profile in the paper-sheet library includes information of the paper-sheet size used for the adjustment. If the information of the paper-sheet size used for the adjustment and the size of the paper-sheet on which the image data obtained in S2101 is printed out do not match, the adjustment value included in the paper-sheet profile is not used. In the present embodiment, although the example where the information of the paper-sheet size used for the adjustment is included in the paper-sheet profile registered to the paper-sheet library is described, the configuration is not limited thereto. The information of the paper-sheet size used for the adjustment may be managed in another region of the HDD 115 or the RAM 113 while associating with the adjustment value.

<Automatic Adjustment Processing>

Next, the processing of automatically adjusting the print position in the present embodiment is described. If the cutting is instructed for the received print job, the printing apparatus 100 of the present embodiment executes the processing of automatically adjusting the print position while executing the print processing described with reference to the flowchart of FIG. 21. The printing apparatus 100 reads the print position adjustment marks formed on the output paper-sheet outputted in S2108 of FIG. 21 by using the reading device 160 and detects the deviation amount of the print position of the image on the output paper-sheet based on the read result. Then, the print position during the image formation is automatically adjusted (corrected) according to the detected deviation amount of the print position. This adjustment is performed in real time. That is, as a result of the adjustment, the print position in the first page and the print position in the second page may be different positions while executing the printing based on the same print job. The automatic adjustment may be called the real-time adjustment.

Figure 22:
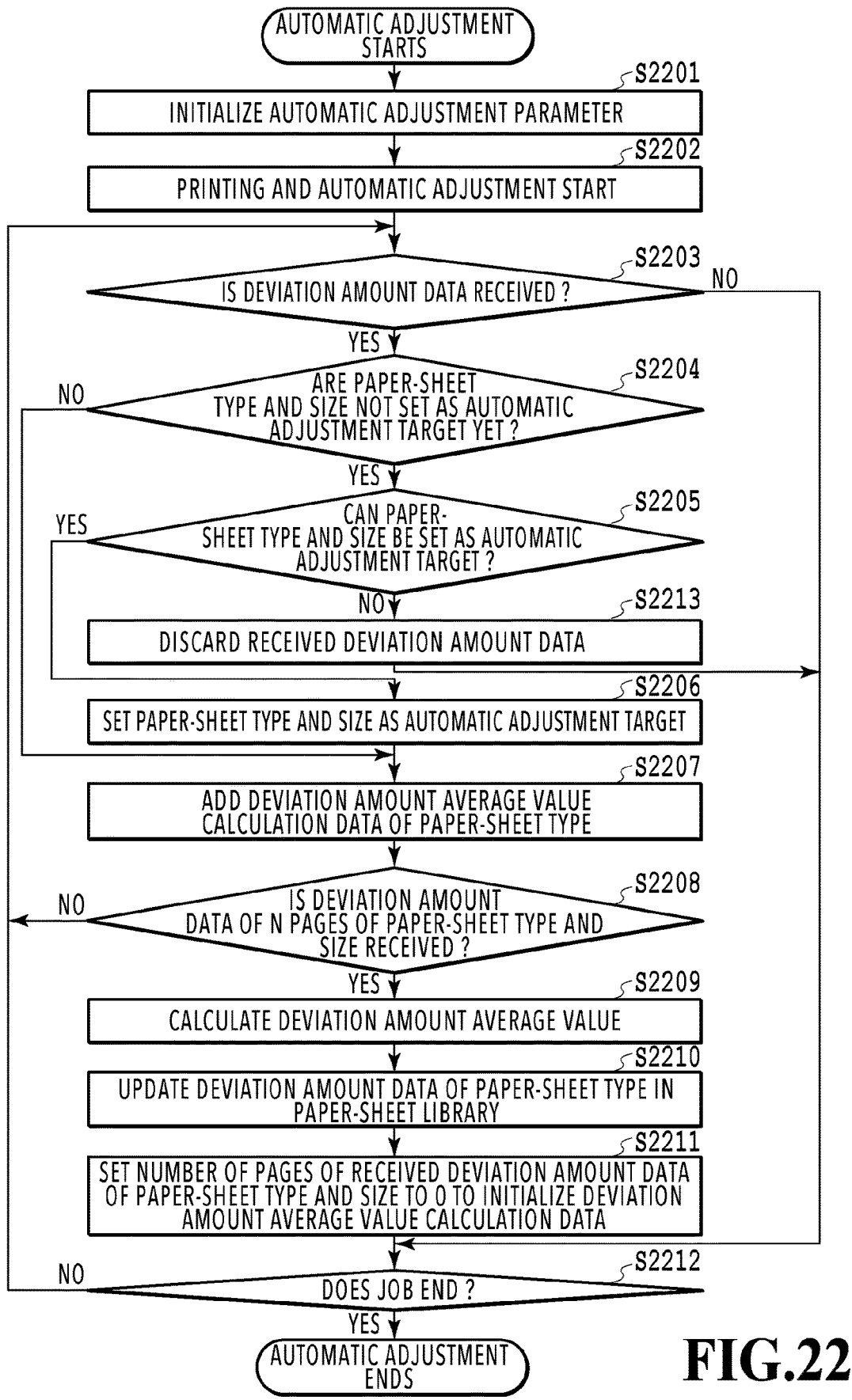
FIG. 22 is a flowchart indicating an automatic adjustment processing.

FIG. 22 is a flowchart describing the automatic adjustment processing of the printing apparatus 100. The flowchart of FIG. 22 indicates the processings executed if the received print job includes the cutting instruction. A trigger for the processings in FIG. 22 is not limited to the case where the received print job includes the cutting instruction, and the processings in FIG. 22 may be started once a predetermined condition for executing the automatic adjustment processing is satisfied. As described below in detail, the processings in FIG. 22 are processings performed concurrently with the print processing in FIG. 21.

First, once the print job is started, in S2201, the CPU 114 initializes various parameters for the automatic adjustment. Specifically, the CPU 114 initializes the information on the paper-sheet type and the paper-sheet size as the automatic adjustment target (sets to a state with no setting done yet) and initializes the print position deviation amount average value calculation data (sets 0). The various parameters for the automatic adjustment are parameters temporarily used in the processings in the flowchart of FIG. 22.

Next, in S2202, the CPU 114 starts the print processing and the automatic adjustment processing. During the automatic adjustment processing, the reading device 160 detects the print position deviation amount of each page simultaneously with the printing-out. The print processing in S2202 is comparable to the print processing indicated in the flowchart of FIG. 21.

Next, in S2203, the CPU 114 confirms whether the print position deviation amount data is received from the reading device 160. If the print position deviation amount data is received, the CPU 114 allows the process to proceed to S2204, and if it is not, the CPU 114 allows the process to proceed to S2212.

In S2204, the CPU 114 confirms whether the paper-sheet type and the paper-sheet size of the paper-sheet of the received print position deviation amount data are not set as the paper-sheet type and the paper-sheet size of the automatic adjustment target yet. The paper-sheet type and the paper-sheet size are the information set in the cassette that feeds the paper-sheet read by the reading device 160. That is, the CPU 114 confirms whether the paper-sheet type and the paper-sheet size set in the cassette that feeds the paper-sheet are not set as the paper-sheet type and the paper-sheet size of the automatic adjustment target yet. As described above, in the flowchart of FIG. 22, the parameters are initialized in S2201 (state with no setting done yet). In S2204, if the paper-sheet type and the paper-sheet size are not set as the automatic adjustment target yet, the CPU 114 allows the process to proceed to S2205, and if the setting is done, the CPU 114 allows the process to proceed to S2207.

In S2205, the CPU 114 confirms whether the paper-sheet of the received print position deviation amount data can be set as the automatic adjustment target paper-sheet. Specifically, if the paper-sheet of the same paper-sheet type is not set as the automatic adjustment target paper-sheet, it is determined that the paper-sheet can be set as the automatic adjustment target paper-sheet, and if it is not, it is determined that the paper-sheet cannot be set as the automatic adjustment target paper-sheet. For example, an example where the paper-sheet of the received print position deviation amount data is a paper-sheet type S1 and also is in the paper-sheet size A4 is described. If the process proceeds to S2205, this means that the paper-sheet of the paper-sheet type S1 and also in the paper-sheet size A4 is determined as not being set as the automatic adjustment target yet in S2204. Thus, the processing in S2205 is substantially a processing similar to the processing of determining whether a paper-sheet of the paper-sheet type S1 but in a size other than the paper-sheet size A4 is set as the automatic adjustment target paper-sheet. That is, if the paper-sheet of the paper-sheet type S1 but in a size other than the paper-sheet size A4 is already set as the automatic adjustment target paper-sheet, there may be a case that the adjustment is not performed properly by using the received print position deviation data of the paper-sheet in the paper-sheet size A4. Thus, if the paper-sheet of the paper-sheet type same as the paper-sheet type S1, which is the paper-sheet type of the paper-sheet of the received print position deviation amount data, is already set as the automatic adjustment target paper-sheet, the CPU 114 determines that the paper-sheet cannot be set as the automatic adjustment target paper-sheet. In S2205, if it is determined that the paper-sheet can be set as the automatic adjustment target paper-sheet, the CPU 114 allows the process to proceed to S2206, and if it is determined that the paper-sheet cannot be set as the automatic adjustment target paper-sheet, the CPU 114 allows the process to proceed to S2213.

The processings in FIG. 22 are processings performed for every print job (to be specific, for every print job including the cutting instruction), and the initialization is performed in S2201. Thus, the case where it is determined that the paper-sheet cannot be set as the automatic adjustment target paper-sheet in S2205 is a case where the processing for a job in which there are instructions for the same paper-sheet type and different paper-sheet sizes mixed in the same print job (hereinafter, called a mixed job) is performed. In the case of the mixed job, if the determination in S2205 is not performed, the deviation amounts (the adjustment values) obtained based on the paper-sheets of the same paper-sheet type S1 but different paper-sheet sizes are fed back as the deviation amount data (the adjustment value) for the paper-sheet type S1. As a result, there may be a case that the position adjustment is not properly performed. With the determination in S2205, if there is the mixed job, the deviation amount is calculated by using a paper-sheet of the paper-sheet size of the received deviation amount data first.

The description of the flowchart is continued. In S2206, the CPU 114 sets the combination of the paper-sheet type and the paper-sheet size of the paper-sheet as the paper-sheet type and the paper-sheet size of the automatic adjustment target. With this, as described above, the paper-sheet size for which the adjustment according to the print position deviation amount performed in S2104 and S2107 of the print processing performed in S2202 (the processings in FIG. 21) is not performed is determined. In S2206, the CPU 114 adds and registers the size information of the paper-sheet size used for the adjustment to the information of the paper-sheet type registered to the paper-sheet library.

Thereafter, in S2207, the CPU 114 adds the print position deviation amount average value calculation data of the paper-sheet type. In S2208, the CPU 114 confirms whether the print position deviation amount data of the predetermined number of pages (N pages) for the paper-sheet type and the paper-sheet size is received. In this process, if it is determined that the data of the predetermined number of pages is received, the CPU 114 allows the process to proceed to S2209, and if it is not, the CPU 114 allows the process to proceed to S2203.

In S2209, the CPU 114 calculates the average value of the print position deviation amounts. Specifically, the value of the print position deviation amount average value calculation data obtained in S2207 is divided by the predetermined number (N) of pages and calculated as the average value. In S2210, the CPU 114 updates the print position deviation amount data of the paper-sheet type in the paper-sheet library by using the average value obtained in S2209. In S2211, the CPU 114 sets the number of pages of the received print position deviation amount data of the paper-sheet type and the paper-sheet size to 0 and initializes the value of the print position deviation amount average value calculation data by 0.

In S2212, the CPU 114 confirms whether the print job ends. In this process, if it is determined that the job ends, the sequential processings end, and if it is not, the process returns to S2203 to continue the processing. In S2213, the CPU 114 discards the received print position deviation amount data and allows the process to proceed to S2212 to continue the processing.

In the flowchart of FIG. 22, the example where the deviation amount average value calculation data is initialized in S2211 if the deviation amount data is updated in S2210 is described. That is, the example where the deviation amount data is updated every time the data of the predetermined number of pages is accumulated by executing the processing in S2211 is described. However, the processing of S2211 may be skipped. That is, once the data of the predetermined number of pages is accumulated, the deviation amount data may be updated every time the data of one page is accumulated.

As described above, if there is the mixed job in which there are instructions for the same paper-sheet type and different paper-sheet sizes mixed in the same print job, the automatic adjustment is performed on only the paper-sheet of the paper-sheet size printed first and associated with the paper-sheet type in the job. With this processing, regarding the adjustment amount (deviation amount) for the print position adjustment, it is possible to inhibit the unintended applying of the result of the adjustment performed for different paper-sheet sizes as the adjustment value for the paper-sheet of the same paper-sheet type but the other improper paper-sheet size.

Although the example where, if there is the mixed job, the automatic adjustment is performed on only the paper-sheet of the paper-sheet size printed first and associated with the paper-sheet type in the job is described in the present embodiment, the configuration is not limited to the example. For example, the user may select whether to perform the automatic adjustment with the switched paper-sheet size in a timing once the switching of the paper-sheet occurs. For example, there may be a process of accepting the selection whether to perform the automatic adjustment with the switched paper-sheet size by the user after the determination is made as NO in S2205 in FIG. 22. Then, if performing the automatic adjustment with the switched paper-sheet size is selected, the process may proceed to S2206, and if it is not, the process proceeds to S2213.

The user may selectively set in advance the cassette (the paper-sheet size) as the automatic adjustment target if the multiple numbers of paper-sheets of the same paper-sheet type are set in the paper-sheet feeding device 140 of the printing apparatus 100. In this case, during the initialization in S2201, the processing may be performed so as not to initialize the information on the paper-sheet type and the paper-sheet size as the automatic adjustment target.

Embodiment 5

In Embodiment 4, the example where, if there is the mixed job, the automatic adjustment is performed on only the paper-sheet of the paper-sheet size printed first and associated with the paper-sheet type in the job is described. Thus, the example where it is possible to inhibit the unintended applying of the result of the adjustment performed for different paper-sheet sizes as the adjustment value for the paper-sheet of the same paper-sheet type but the other improper paper-sheet size is described.

In Embodiment 5, an example where, if the print job as the automatic adjustment target is received, the RIP processing is performed on all the pages before the printing to determine the paper-sheet type and the paper-sheet size to be the automatic adjustment target is described. For example, if the print job is the mixed job using the paper-sheets of the same paper-sheet type but different paper-sheet sizes, the paper-sheet size having the greatest number of output pages is set as the automatic adjustment target. Hereinafter, different points from Embodiment 4 are mainly described.

Figure 23:
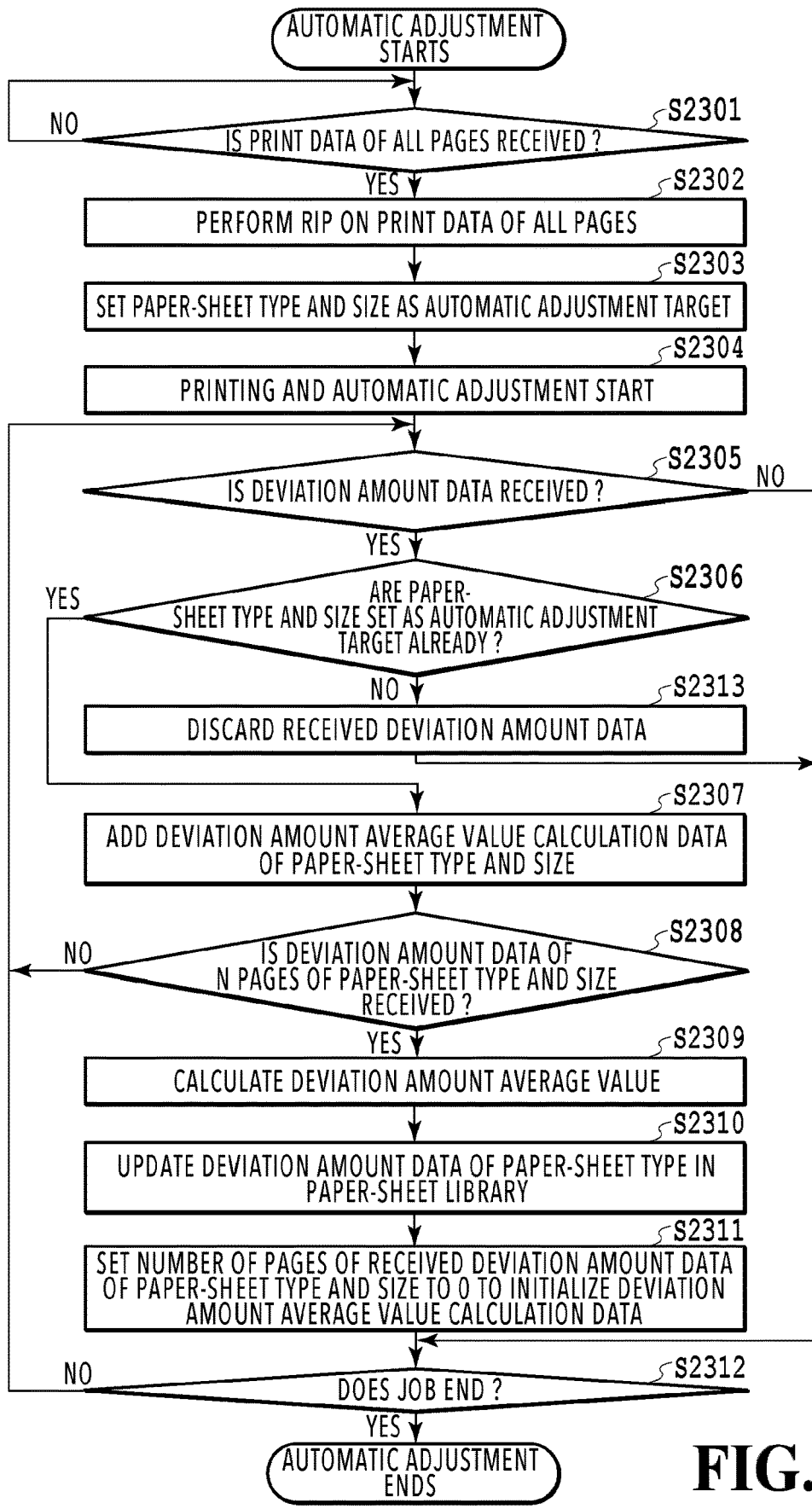
FIG. 23 is a flowchart indicating an automatic adjustment processing.

FIG. 23 is a flowchart of the automatic adjustment processing of the printing apparatus 100 in the present embodiment. The flowchart of FIG. 23 includes processings to be executed if the received print job includes the cutting instruction like the automatic adjustment processing described in Embodiment 4. A trigger for the processings in FIG. 23 is not limited to the case where the received print job includes the cutting instruction, and the processings in FIG. 23 may be started once a predetermined condition for executing the automatic adjustment processing is satisfied.

First, once the print job is started, in S2301, the CPU 114 confirms whether the printing data of all the pages of the print job is received. In this case, if the reception of the printing data of all the pages is completed, the CPU 114 allows the process to proceed to S2302, and if it is not, the CPU 114 waits until the reception of the printing data of all the pages is completed in S2301. Once the reception of the printing data of all the pages is completed, in S2302, the CPU 114 performs the RIP processing of the printing data of all the pages. With the RIP processing performed, the paper-sheet size to be used for printing each page is determined. Next, in S2303, the CPU 114 determines the combination of the paper-sheet type and the paper-sheet size to be the automatic adjustment target. Specifically, if there is the mixed job using the paper-sheets of the same paper-sheet type but mixed paper-sheet sizes in the print job, the paper-sheet size of the greatest number of output pages is set as the target of the automatic adjustment of the associated paper-sheet type. In S2303, the CPU 114 adds and registers the size information of the paper-sheet size used for the adjustment to the information of the paper-sheet type registered to the paper-sheet library.

Next, in S2304, the CPU 114 starts the print processing and the automatic adjustment processing. During the automatic adjustment processing, the reading device 160 detects the print position deviation amount of each page simultaneously with the printing-out. Next, in S2305, the CPU 114 confirms whether the print position deviation amount data is received from the reading device 160. If the print position deviation amount data is received, the CPU 114 allows the process to proceed to S2306, and if it is not, the CPU 114 allows the process to proceed to S2312.

In S2306, the CPU 114 confirms whether the paper-sheet type and the paper-sheet size of the paper-sheet of the received print position deviation amount data is already set as the paper-sheet type and the paper-sheet size of the automatic adjustment target. If the paper-sheet type and the paper-sheet size is already set as the automatic adjustment target, the CPU 114 allows the process to proceed to S2307, and if it is not, the CPU 114 allows the process to proceed to S2313.

The processings from S2307 to S2313 is similar to the processings described in S2207 to S2213 in FIG. 22; thus, the descriptions thereof are omitted.

As described above, in the present embodiment, for the automatic adjustment target job, the RIP processing is performed for all the pages before the printing, and if there are the paper-sheets of the same paper-sheet type but mixed paper-sheet sizes, the paper-sheet size of the greatest number of the output pages is determined as the automatic adjustment target. Since the calculation of the deviation amount is performed by using the average of the deviation amounts of the multiple pages, it is possible to improve the adjustment accuracy as the number of output pages is great. Additionally, it is also possible in the present embodiment to inhibit the unintended applying of the result of the adjustment performed for different paper-sheet sizes as the adjustment value for the paper-sheet of the same paper-sheet type but the other improper paper-sheet size.

<<Specific Examples of Embodiments>>

Next, specific examples of the cases of using Embodiment 4 and Embodiment 5 are described with reference to the drawings. The examples described below are examples applicable to either of Embodiment 4 or Embodiment 5.

Figure 24:
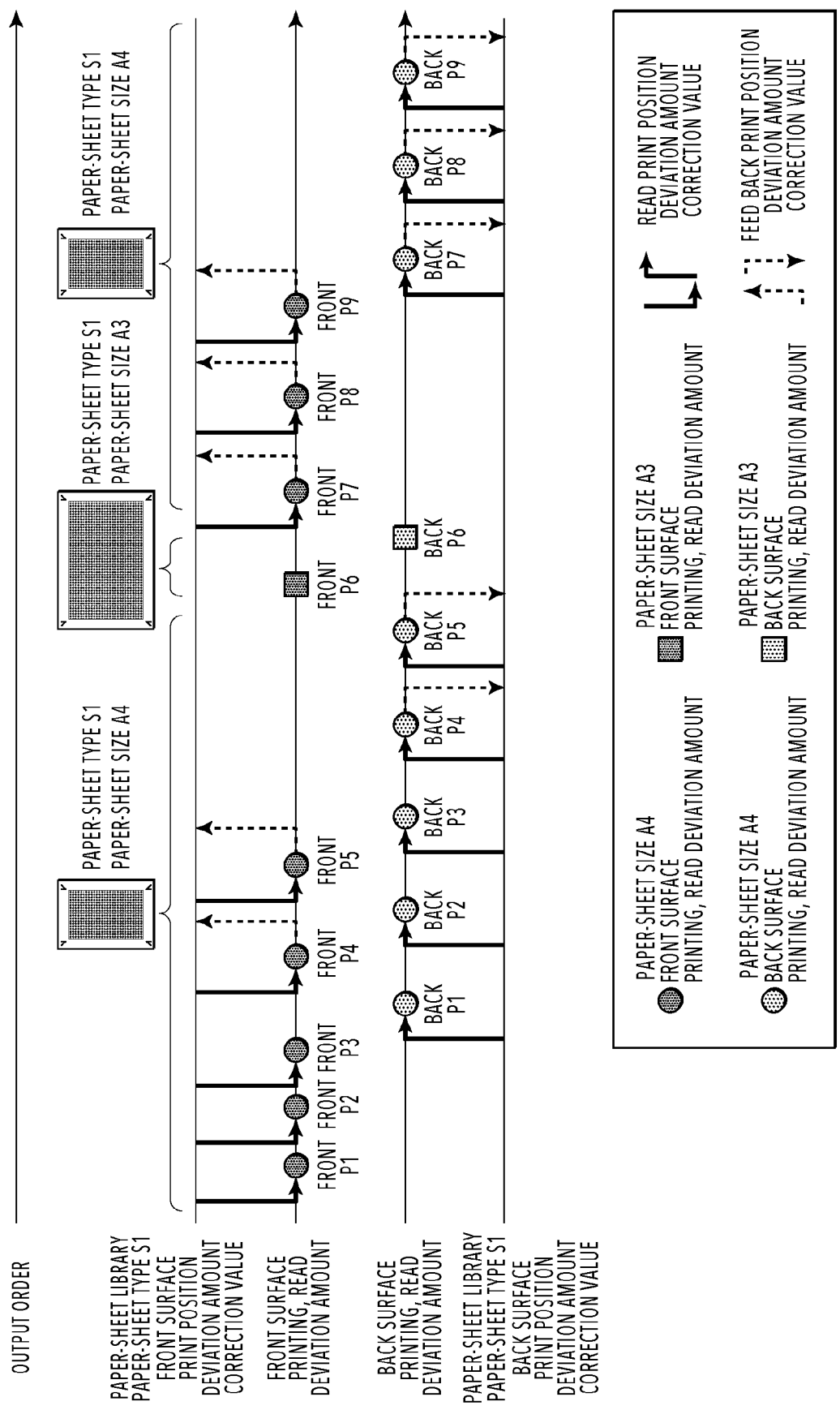
FIG. 24 is a timing chart illustrating a relationship between processings during the automatic adjustment.

FIG. 24 is a timing chart illustrating the relationship between the output order of the output paper-sheet in the automatic adjustment of the printing apparatus 100, the processing of reading the output image by the reading device 160, and the feedback of the print position deviation amount adjustment value to the paper-sheet library. FIG. 24 illustrates the procedure of performing the automatic adjustment for the print job (mixed job) using the paper-sheets of the same paper-sheet type (the paper-sheet type S1) but mixed paper-sheet sizes (the paper-sheet size A4 and the paper-sheet size A3). It is assumed that the paper-sheet size A4 is selected as the paper-sheet size of the automatic adjustment target according to the method of Embodiment 4 or Embodiment 5 described above.

In FIG. 24, for the paper-sheet size A4, the printing apparatus 100 performs the reading of the print position deviation amount adjustment value from the paper-sheet library and the feedback of the print position deviation amount adjustment value to the paper-sheet library for both the front surface and the back surface. On the other hand, for the paper-sheet size A3, FIG. 24 illustrates that the printing apparatus 100 does not perform the reading of the print position deviation amount adjustment value from the paper-sheet library and the feedback of the print position deviation amount adjustment value to the paper-sheet library.

Figure 25:
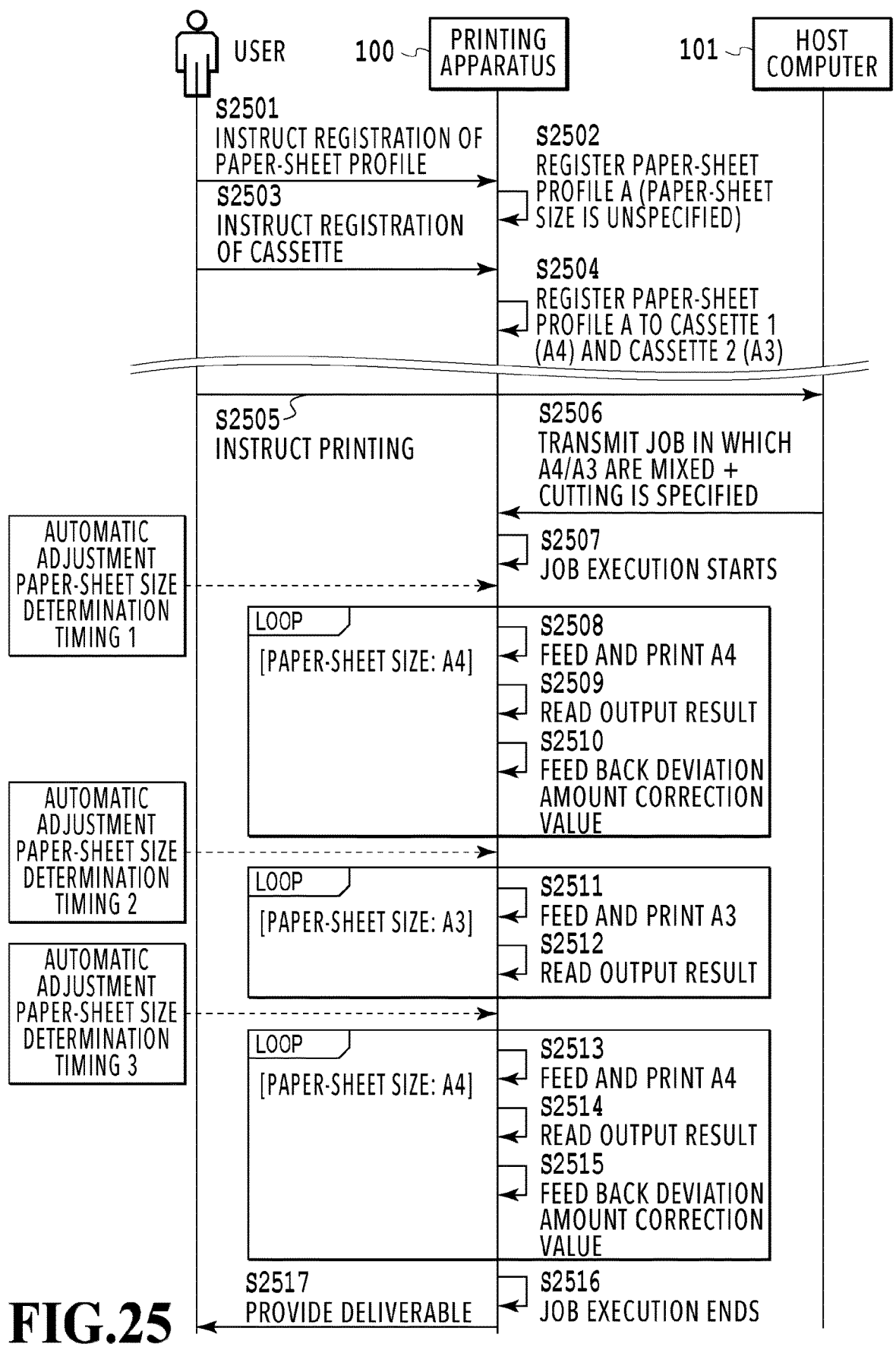
FIG. 25 is a sequence diagram indicating a procedure of the automatic adjustment.

FIG. 25 is a diagram illustrating a processing sequence of the automatic adjustment in the overall printing system according to the above-described embodiment. In FIG. 25, first, in S2501, the user instructs the printing apparatus 100 to register a paper-sheet profile. That is, the printing apparatus 100 receives the input of the instruction of registering a paper-sheet profile from the user. The instruction of registering a paper-sheet profile includes an operation flow of setting and registering the attribute information on the paper-sheet type to the paper-sheet library described above with reference to FIGS. 4 and 5. In Embodiments 4 and 5, the information on the paper-sheet length is not registered. For this reason, the entry field 509 may not be displayed. Next, in S2502, the printing apparatus 100 registers the paper-sheet profile (the paper-sheet profile A) instructed in S2501 to the paper-sheet library. At this moment, the paper-sheet profile A does not include information on the paper-sheet size. Next, in S2503, the user instructs the printing apparatus 100 to register a cassette. That is, the printing apparatus 100 receives the input of the instruction of registering a cassette from the user. The instruction of registering a cassette includes an operation flow of setting and registering the paper-sheet type to each cassette of the printing apparatus 100 as described above with reference to FIGS. 9A and 9B. In this case, the user inputs the instruction of registering the paper-sheet type of the paper-sheet profile A to the cassettes 1 and 2. Next, in S2504, the printing apparatus 100 sets and registers the paper-sheet profile (the paper-sheet profile A) instructed in S2503 to the specified cassettes. In this case, the paper-sheet profile A is set and registered to the cassette 1 (the paper-sheet size A4) and the cassette 2 (the paper-sheet size A3) as a profile of the paper-sheet type.

Next, in S2505, the user operates the host computer 101 to instruct the printing related to the print job. That is, the host computer 101 receives the input of the printing instruction by the user. Once receiving the printing instruction, in S2506, the host computer 101 transmits the print job to the printing apparatus 100. In this case, the print job includes not only the image data to be printed but also various types of information necessary for the printing such as the paper-sheet type (the paper-sheet profile) to be used for the printing, the paper-sheet size, the number of printed sheets, the instruction of printing whether duplex or simplex, and the instruction of the cutting printing. In this case, the print job includes the image data of the paper-sheet size A4/A3 mixed together, and also the cutting is instructed. Accordingly, the printing apparatus 100 reads the print position adjustment marks formed in a blank region around the image formed on the output paper-sheet of the print job, and performs the processing of adjusting the deviation amount of the image to be formed on the paper-sheet based on the read result. Once receiving the print job, in S2507, the printing apparatus 100 starts executing the print job. For the print job, A4-size is selected as the paper-sheet size of the automatic adjustment target according to the method of Embodiment 4 or Embodiment 5 described above. The print job includes the image data in the order of A4-size, A3-size, and A4-size.

First, the printing apparatus 100 starts the printing-out of A4-size and determines to perform the automatic adjustment for the paper-sheet (automatic adjustment paper-sheet size determination timing 1). The printing apparatus 100 performs processings of feeding and printing (S2508), reading of the output result by the reading device 160 (S2509), and feedback of the print position deviation amount adjustment value (S2510) for the printing-out of the paper-sheet. In this case, the processings from S2508 to S2510 are executed repeatedly until the output paper-sheet size is switched.

Next, the printing apparatus 100 starts the printing-out of A3-size and determines not to perform the automatic adjustment on the paper-sheet (automatic adjustment paper-sheet size determination timing 2). The printing apparatus 100 performs processings of feeding and printing (S2511) and reading of the output result by the reading device 160 (S2512) for the printing-out of the paper-sheet. Since the paper-sheet is not in the paper-sheet size of the automatic adjustment target, the feedback of the print position deviation amount adjustment value is not executed. In this case, the processings from S2511 to S2512 are executed repeatedly until the output paper-sheet size is switched.

Next, the printing apparatus 100 starts the printing-out of A4-size again, and determines to perform the automatic adjustment on the paper-sheet (automatic adjustment paper-sheet size determination timing 3). The printing apparatus 100 performs processings of feeding and printing (S2513), reading of the output result by the reading device 160 (S2514), and feedback of the print position deviation amount adjustment value (S2515) for the printing-out of the paper-sheet. In this case, the processings from S2513 to S2515 are executed repeatedly for all the remaining output pages.

Once the printing-out of all the pages related to the print job are completed by executing S2508 to S2515, the printing apparatus 100 terminates the execution of the print job in S2516. Then, in S2517, the user obtains the outputted deliverable of the print job.

Figure 26:
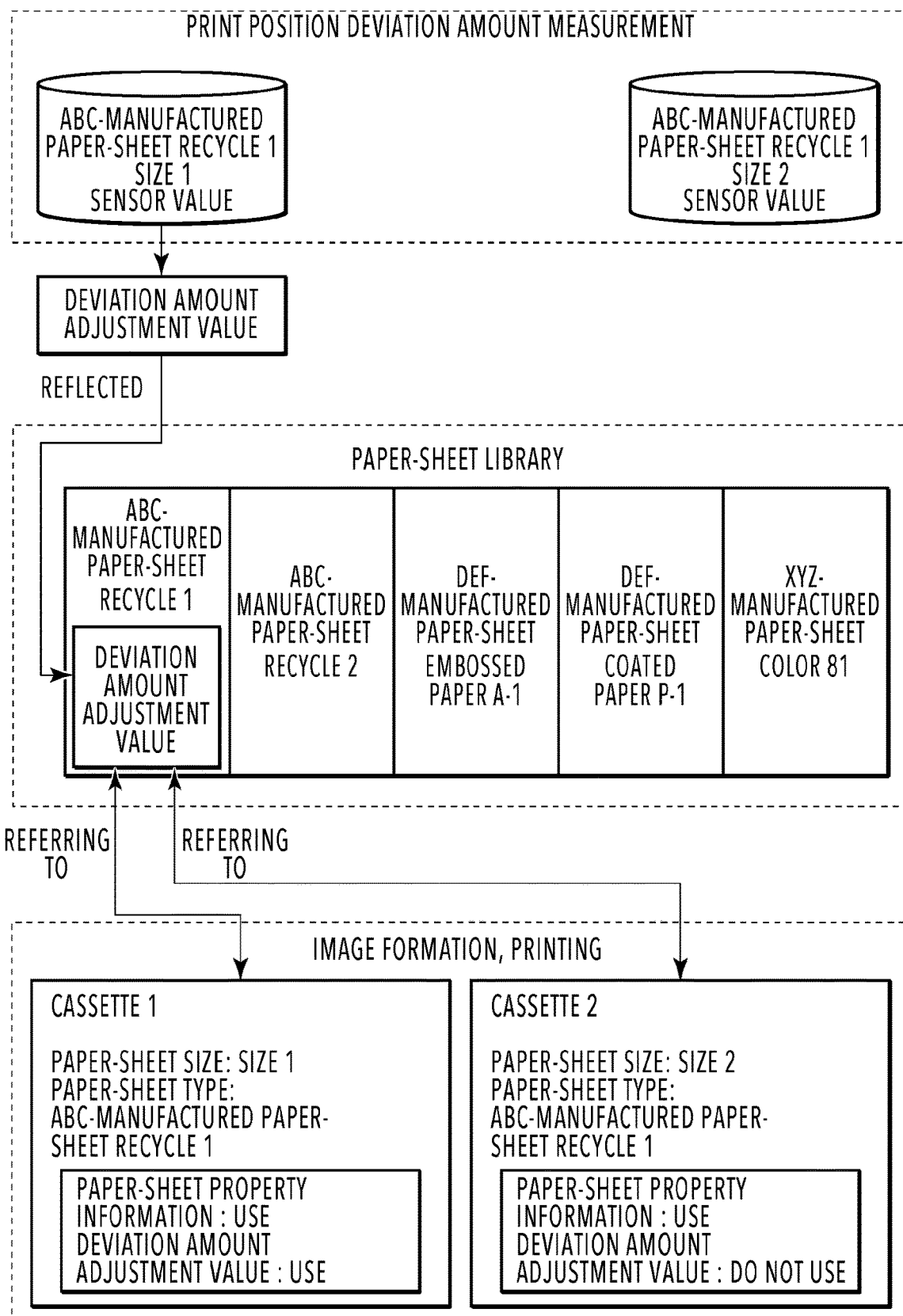
FIG. 26 is a diagram illustrating an example where a print position deviation amount adjustment value is valid in only a limited cassette.

FIG. 26 is a diagram illustrating an example where the print position deviation amount adjustment value is valid in only some cassettes. That is, FIG. 26 is a conceptual diagram describing the control and data flow in which, with the paper-sheet sizes being mixed, the print position deviation amount adjustment value is valid for only one paper-sheet size and is not used for the other paper-sheet sizes, during the automatic adjustment of the printing apparatus 100. In FIG. 26, the cassette 1 (the paper-sheet size=size 1) and the cassette 2 (the paper-sheet size=size 2) are illustrated as the cassettes of different paper-sheet sizes. The same paper-sheet profile (the paper-sheet type=ABC-manufactured paper-sheet recycle 1) is set in and registered to the cassette 1 and the cassette 2. The automatic adjustment (the measurement of the print position deviation amount and the feedback to the paper-sheet library) is executed only for the printing-out on the paper-sheet in the cassette 1 (the paper-sheet size=size 1). In the cassette 1, the printing is performed by using both the paper-sheet property information and the deviation amount adjustment value registered (reflected) to the paper-sheet library. On the other hand, the automatic adjustment is not executed for the printing-out on the paper-sheet in the cassette 2 (the paper-sheet size=size 2). FIG. 26 illustrates the cassette 2 in which the printing is performed by using the paper-sheet property information registered to the paper-sheet library, but the printing using the deviation amount adjustment value registered to the paper-sheet library is not performed.

(Other Modifications)

In Embodiments 4 and 5 described above, the example where the printing adjustment marks are printed and the automatic adjustment is performed if the print job as the printing target includes the cutting instruction is described. However, the execution of the automatic adjustment may be instructed by different dedicated parameters without associating with the cutting instruction.

In Embodiments 4 and 5, the example where the printing of the print position adjustment marks and the reading of the image by the reading device 160 are performed also for a paper-sheet other than the paper-sheet as the automatic adjustment target is described. Then, the example where the calculation of the average value of the print position deviation amounts and the feedback to the paper-sheet library are performed only for the paper-sheet as the automatic adjustment target is described. However, the printing of the print position adjustment marks and the reading of the image by the reading device 160 may be performed only for the paper-sheet as the automatic adjustment target.

A behavior for the case where the mixed job using the paper-sheets of the same paper-sheet type but mixed paper-sheet sizes in the same print job is received may be selected and set by the user in advance. For example, the user may set in advance whether to determine the paper-sheet as the automatic adjustment target according to the method of either Embodiment 4 or Embodiment 5, and the automatic adjustment may be executed according to the setting.

In Embodiments 4 and 5 described above, the processing of the case where the mixed job using the paper-sheets of mixed paper-sheet sizes in the same print job is received is mainly described. However, it is possible to perform the adjustment of the print position properly also in the case where a print job other than the mixed job is received. For example, it is assumed that the deviation amount adjustment value of the paper-sheet type S1 is calculated based on the paper-sheet size of A4-size by the processing of Embodiment 4 or Embodiment 5. Additionally, it is assumed that the paper-sheet type S1 of the paper-sheet library includes the information on A4-size as the size information used for the adjustment.

The processing of the printing apparatus 100 for the case where a print job J1 including the image data of the paper-sheet type S1 and A4-size in the above state is described. The printing apparatus 100 refers to the paper-sheet profile of the paper-sheet library based on the paper-sheet type S1 of the received print job J1 and obtains the information on the paper-sheet size (A4-size) used for the adjustment included in the paper-sheet profile of the paper-sheet type S1. Since the printing of the size same as the paper-sheet size used for the adjustment is performed, the printing apparatus 100 performs the reading of the print position deviation amount adjustment value from the paper-sheet library and the feedback of the print position deviation amount adjustment value to the paper-sheet library.

On the other hand, the processing for the case where the printing apparatus 100 receives a print job J2 including the image data of the paper-sheet type S1 and A3-size is described. The printing apparatus 100 refers to the paper-sheet profile in the paper-sheet library based on the paper-sheet type S1 of the received print job J2 and obtains the information on the paper-sheet size (A4-size) used for the adjustment included in the paper-sheet profile of the paper-sheet type S1. Since the printing of the size different from the paper-sheet size used for the adjustment is performed, the printing apparatus 100 does not perform the reading of the print position deviation amount adjustment value from the paper-sheet library and the feedback of the print position deviation amount adjustment value to the paper-sheet library.

In a case where the mixed job is received while the adjustment of the paper-sheet type S1 is already performed by a single print job of A4-size, the paper-sheet size to be used for the adjustment may be determined again according to the processing described in Embodiment 4 or Embodiment 5. Otherwise, a behavior for the case where the mixed job is received while the adjustment of the paper-sheet type S1 is already performed by the single print job of A4-size may be set by the user in advance.

The meanings of the abbreviations used herein are as follows.

ASIC means an Application Specific Integrated Circuit.
CSV means a Comma Separated Value.
CPU means a Central Processing Unit.
FAX means a facsimile.
HDD means a Hard Disk Drive.
LAN means a Local Area Network.
LCD means a Liquid Crystal Display.
MFP means a Multi Function Peripheral.
NVRAM means a Non-Volatile RAM.
PC means a Personal Computer.
PDL means a Page Description Language.
RAM means a Random-Access Memory.
RIP means a Raster image processor.
ROM means a Read Only Memory.
XML means an Extensible Markup Language.

Other Embodiments

The present invention is not limited to the above-described embodiments, and various modifications (including organic combinations of the embodiments) are possible based on the gist of the present invention and should not be excluded from the scope of the present invention. That is, the above-described embodiments and the configuration combining the modifications of the embodiments are all included in the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-168341, filed Sep. 17, 2019, and No. 2019-215444, filed Nov. 28, 2019, which are hereby incorporated by reference wherein in their entirety.

What is claimed is:

1. An image formation apparatus, including:
a plurality of cassettes each configured to set a sheet size of a sheet stored therein, in which a common sheet profile can be commonly set in the plurality of cassettes storing sheets of the same sheet type but different sheet sizes;
an image forming device configured to form an image on a sheet;
an image reading device configured to read from a sheet; and
one or more controllers being configured to:
cause the image forming device to form a predetermined image on a sheet fed from one cassette in which the common sheet profile and first sheet size are set;
cause the image reading device to read the sheet on which the predetermined image is formed;
generate a new sheet profile based on the common sheet profile, wherein the new sheet profile is configured for the first sheet size; and
obtain an adjustment value for adjusting a print position of the first sheet size based on the read image, and input the adjustment value to the new sheet profile.

2. The image formation apparatus according to claim 1, wherein
a common sheet profile is prepared for each sheet type.

3. The image formation apparatus according to claim 1, wherein
the controllers are configured to form an image by using the adjustment value registered to the new sheet profile in a case where the image is to be formed on a sheet of a sheet type corresponding to the new sheet profile and of the first sheet size.

4. The image formation apparatus according to claim 1, wherein
the controllers are configured to register the adjustment value to the new sheet profile based on only the result of reading the sheet of the first sheet size on which the predetermined image is formed, in a case where the print job at least includes mixed image data of sheet sizes of the first sheet size and a size different from the first sheet size in the same job.

5. The image formation apparatus according to claim 1, wherein
the image formation apparatus is arranged so that the image on the sheet is read at a position downstream of a position where the image is formed on the sheet in a conveyance path through which the sheet fed from the cassette is conveyed.

6. The image formation apparatus according to claim 1, the processor being configured to:
display a screen on a display device that accepts manual input of the adjustment value.

7. The image formation apparatus according to claim 1, the processor being configured to:
display information on a display device based on the result of reading by the reading device.

8. The image formation apparatus according to claim 1, wherein
the predetermined image is formed on an end portion of the sheet.

9. The image formation apparatus according to claim 1, the processor being configured to:
display a screen on a display device that accepts a specification of whether to obtain the adjustment value in a sequential processing processes.

10. The image formation apparatus according to claim 1, the controllers being configured to:
communicate with an external device;
obtain printing data via communication with the external device; and
determine whether setting information that indicates whether to obtain the adjustment value in a sequential processing processes is associated with the obtained printing data.

11. The image formation apparatus according to claim 1, wherein
the adjustment value includes at least one of a right-angle correction amount, a trapezoidal correction amount, a lead position, a side position, a main scanning magnification, and a sub scanning magnification.

* * * * *